US011599294B2

(12) United States Patent
Fouda

(10) Patent No.: US 11,599,294 B2
(45) Date of Patent: Mar. 7, 2023

(54) MEDIA STORAGE FOR ONLINE MEETINGS IN EDGE NETWORK STORAGE

(71) Applicant: Microsoft Technology Licensing, LLC, Redmond, WA (US)

(72) Inventor: Amr M. Fouda, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/189,764

(22) Filed: Mar. 2, 2021

(65) Prior Publication Data

US 2022/0283706 A1    Sep. 8, 2022

(51) Int. Cl.
*G06F 3/00* (2006.01)
*G06F 3/06* (2006.01)
*G06F 21/62* (2013.01)

(52) U.S. Cl.
CPC ............ *G06F 3/065* (2013.01); *G06F 3/0604* (2013.01); *G06F 3/0688* (2013.01); *G06F 21/6245* (2013.01)

(58) Field of Classification Search
None
See application file for complete search history.

(56) References Cited

U.S. PATENT DOCUMENTS

| 5,812,773 A | 9/1998 | Norin |
| 6,629,129 B1 * | 9/2003 | Bookspan .............. G06Q 10/10 709/204 |
| 7,689,602 B1 | 3/2010 | Sim-Tang |
| 7,949,640 B2 | 5/2011 | Holenstein et al. |
| 8,301,593 B2 | 10/2012 | Hoffmann et al. |
| 9,065,830 B2 * | 6/2015 | Tamblyn ................. H04M 3/22 |
| 9,830,333 B1 | 11/2017 | Wisniewski et al. |
| 10,671,639 B1 | 6/2020 | Acheson et al. |
| 2007/0250641 A1 | 10/2007 | Flannery et al. |

(Continued)

FOREIGN PATENT DOCUMENTS

| EP | 1462960 A2 | 9/2004 |
| WO | 2015108760 A1 | 7/2015 |

OTHER PUBLICATIONS

"Notice of Allowance Issued in U.S. Appl. No. 17/189,814", dated Aug. 5, 2022, 13 Pages.

(Continued)

*Primary Examiner* — Midys Rojas
(74) *Attorney, Agent, or Firm* — Schwegman Lundberg & Woessner, P.A.

(57) ABSTRACT

Disclosed in some examples are improved storage, replication, and distribution of data related to network-based meetings (e.g., media) in hierarchical records. Data for one or more components of the meeting (e.g., media) may be stored in a child record (called a component record). The network-based meeting may be described by a parent record with links to, and in some examples descriptions of, the meeting component records (the child records). The meeting object may point to local, and/or replicated copies of the child records. As noted, the child records may be or include media objects and, in some examples, the child records may be replicated to one or more locations based upon a demand for the media object. By replicating the media to a location that is close to demand for the media, this provides for more efficient delivery of media of the meeting.

20 Claims, 18 Drawing Sheets

(56) References Cited

U.S. PATENT DOCUMENTS

| | | |
|---|---|---|
| 2013/0339297 A1 | 12/2013 | Chen |
| 2014/0025692 A1 | 1/2014 | Pappas et al. |
| 2014/0280876 A1 | 9/2014 | Wiklund et al. |
| 2017/0147448 A1 | 5/2017 | Kizhakkel et al. |
| 2019/0318321 A1 | 10/2019 | Lopez Venegas et al. |
| 2020/0065132 A1 | 2/2020 | Mercier et al. |
| 2020/0293550 A1 | 9/2020 | Acheson et al. |
| 2021/0174641 A1* | 6/2021 | Simons .............. G07F 17/3223 |
| 2022/0284039 A1 | 9/2022 | Fouda |
| 2022/0284042 A1 | 9/2022 | Fouda |

OTHER PUBLICATIONS

"International Search Report & Written Opinion issued in PCT Application No. PCT/US22/017119", dated Jul. 12, 2022, 11 Pages.

"International Search Report & Written Opinion issued in PCT Application No. PCT/US22/017123", dated Jul. 27, 2022, 12 Pages.

"International Search Report & Written Opinion Issued in PCT Application No. PCT/US22/017121", dated Sep. 12, 2022, 14 Pages.

"Non Final Office Action Issued in U.S. Appl. No. 17/189,581", dated Mar. 21, 2022, 29 Pages.

"Non Final Office Action Issued in U.S. Appl. No. 17/189,814", dated Mar. 17, 2022, 19 Pages.

Almeida, Sergio Garrau, "Geo-Replication in Large-Scale Cloud Computing Applications", In Master's Thesis in Univ. Técnica de Lisboa, 2007, pp. 1-26.

Choudhury, SID, "9 Techniques to Build Cloud-Native, Geo-Distributed SQL Apps with Low Latency", Retrieved from: https://blog.yugabyte.com/9-techniques-to-build-cloud-native-geo-distributed-sql-apps-with-low-latency/, Oct. 17, 2019, 9 Pages.

Goel, et al., "Data Replication Strategies in Wide-Area Distributed Systems", In Journal of Enterprise Service Computing: from Concept to Deployment, 2007, 27 Pages.

Hopkins, et al., "Use Geo-Redundancy to Design Highly Available Applications", Retrieved from: https://docs.microsoft.com/en-us/azure/storage/common/geo-redundant-design, Sep. 23, 2021, 6 Pages.

Mukherjee, et al., "Data Mining-Based Hierarchical Transaction Model for Multi-Level Consistency Management in Large-Scale Replicated Databases", In Journal of Computer Standards & Interfaces, Sep. 23, 2020, 3 Pages.

Urbano, et al., "Oracle® Database Advanced Replication", Retrieved from: https://docs.oracle.com/cd/B19306_01/server.102/b14226.pdf, Nov. 2007, 244 Pages.

U.S. Appl. No. 17/189,581, filed Mar. 2, 2021, Replication of Parent Record Having Linked Child Records That Were Previously Replicated Asynchronously Across Data Storage Regions.

U.S. Appl. No. 17/189,814, filed Mar. 2, 2021, Asynchronous Replication of Linked Parent and Child Records Across Data Storage Regions.

* cited by examiner

MEDIA STORAGE FOR ONLINE MEETINGS IN EDGE NETWORK STORAGE

TECHNICAL FIELD

Embodiments pertain to replication of hierarchical data. Some embodiments relate to efficient replication of hierarchical data. Some embodiments relate to efficient updates to replicated data. Some embodiments relate to storing and replication of network-based meeting data and media.

BACKGROUND

Data may be replicated across one or more storage devices in one or more data storage locations or regions. Replication may be performed for a variety of reasons. For example, replication may enhance data availability by storing multiple copies of the data in different locations. If one of the locations becomes unavailable or loses the data, the data is still available in another location. In some other examples, privacy laws may require data generated in one location to be replicated to another location. In still other examples, data is migrated in order to create a backup copy of the data in case the primary copy is lost or corrupted.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
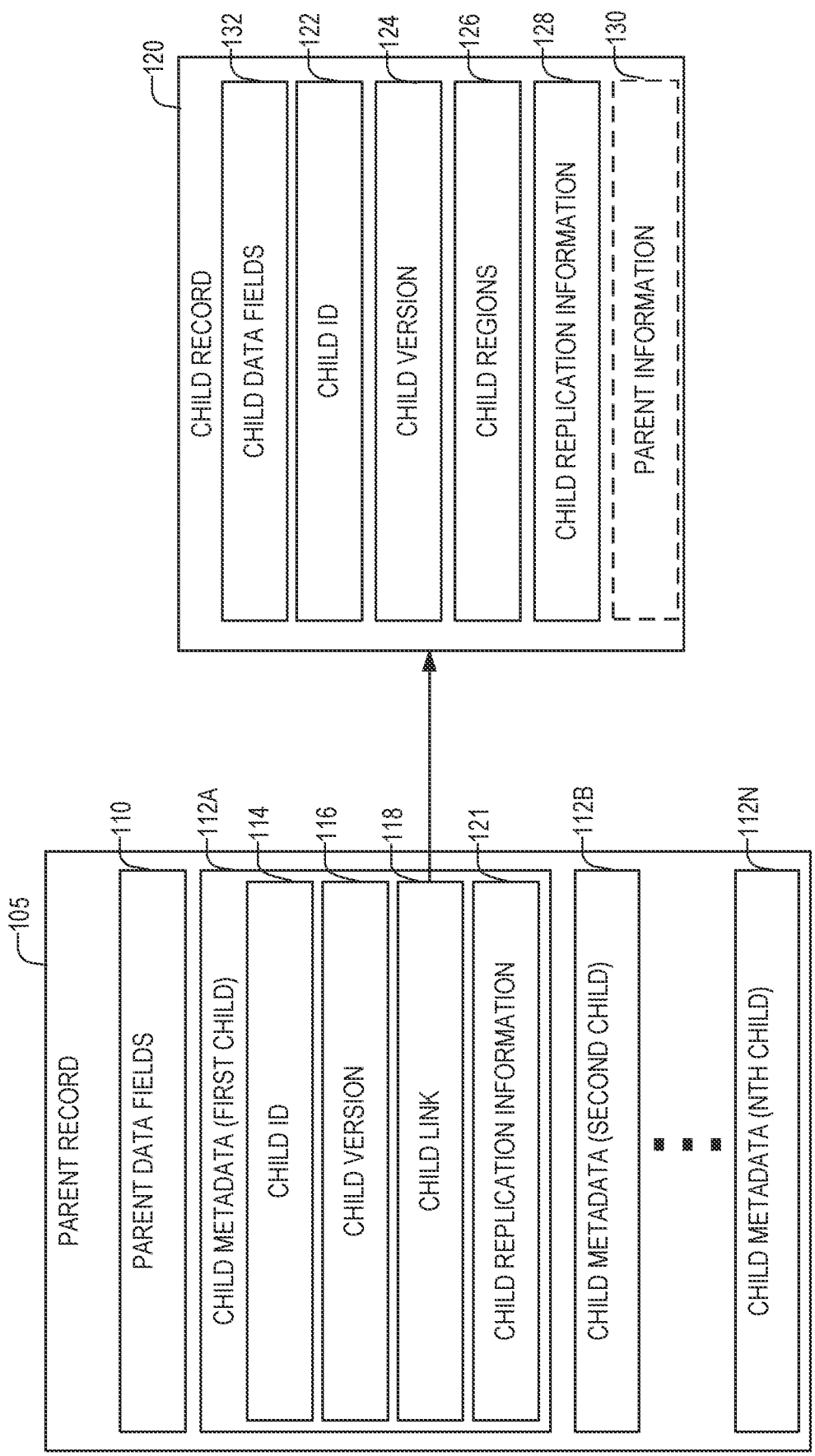
FIG. 1 illustrates a schematic of a parent record and a corresponding child record according to some examples of the present disclosure.

Records may be flat-structured, in that they do not have links or references to other objects that also need to be replicated. In other examples, records may be hierarchical in that they have links to other records that need to be replicated. The hierarchy may be a parent-child hierarchy in that a parent record includes references to a plurality of child records that may be distinct from the parent record. In some examples, the parent record in a hierarchical record may also include links to local copies of its child records so the child records are easily located.

Replication of flat structured records may be simple as these records may be immediately replicated once they are available by copying them to another storage device. Flat structured records may not be appropriate in certain circumstances, such as where the amount of data stored in the record gets very large. In some examples, a hierarchical record may be more manageable as each piece may be replicated individually.

On the other hand, when the records to be replicated are hierarchical there may be complications to efficient replication. For example, in order to make finding pieces of hierarchical records easier, the records may have links to other pieces. For example, a parent record may have links to a local copy of the child records. The complications come from the difficulty in properly updating the links in the parent record to the child records given the possibility that parent records and child records may arrive out of order. For example, a parent record may become available for replication first before the child record becomes available. The replicated parent record needs to update its links to the child records when the child records are later replicated. This presents a book-keeping issue as the system then needs to periodically check to determine whether the child records have been replicated. Similarly, if the child records are replicated first, then the system needs to have a way of tracking the child record's location once the parent record is finally replicated to update the links in the parent.

Prior art solutions typically delay replication of hierarchical records until the data center receives all the associated records. For situations where a parent record may have hundreds or thousands of corresponding child records, and where a system may have thousands of records it needs to process, waiting to receive all records before starting replication is an enormous cost in terms of time and computing resources. For example, additional memory resources may be needed to store and manage the thousands of records waiting on replication. Such a system may also cause bursts of processing and network traffic once the records are available as the system tries to process thousands of records at once and send them for replication. This may stress network and computing resources.

Furthermore, in cases in which the records may be updated at a future date, once these records are replicated, they may be replicated to many different data storage regions. If there is a change to one of these records, these changes need to be replicated to all other regions. Finding the regions affected and performing this replication may be as costly as the original replication.

Disclosed in some examples are methods, systems, and machine readable mediums for efficient asynchronous replication of hierarchical records across data storage locations. In some examples of the disclosed system, child records may be replicated as they are received without waiting for the parent records to be received and without waiting for other child records to be received. In other examples of the disclosed systems, both parent and child records may be replicated as they are received. This provides for faster replication of the hierarchical record. Methods and systems are also described for efficiently updating replicated records.

Disclosed also in some examples are improved storage, replication, and distribution of data related to network-based meetings (e.g., media) in hierarchical records. Data for one or more components of the meeting (e.g., media) may be stored in a child record (called a component record). The network-based meeting may be described by a parent record with links to, and in some examples descriptions of, the meeting component records (the child records). The meeting object may point to local, and/or replicated copies of the child records. As noted, the child records may be or include media objects and, in some examples, the child records may be replicated to one or more locations based upon a demand for the media object. By replicating the media to a location that is close to demand for the media, this provides for more efficient delivery of media of the meeting. The use of hierarchical records for storing meeting information is more efficient as pieces of the meeting may be stored in different locations and handled separately. This also allows the system to host larger network-based meetings.

As used herein, a hierarchical record may include a parent record and one or more child records of the parent. The replicator system may process parent and child records asynchronously as they arrive. Upon receiving either a parent or child record, the replicator may automatically identify the relationships between the parent and child. For example, upon receiving a parent record, the replicator system may identify metadata in the parent record identifying the child records. In some examples, child records may also have information linking them to the parent records (e.g., a parent identifier).

In some examples, the replication policy of the system may specify whether parent records are to be replicated to each data storage region to which a child was replicated to. In some examples, the replication policy may also specify whether child records are cross replicated based upon their relationships with sibling child records. That is, a first child record that is replicated to a first region and whether a sibling child record is also replicated to the first region may be specified by the replication policy (which may consider information in the sibling record along with the fact that the first child record was replicated).

In some examples, upon receiving a notification that child record is available for replication, the child record may be immediately replicated regardless of the status of the replication of other child records or the parent record. The replicator system may utilize replication information in the child record and a replication policy to determine whether to replicate the child record to one or more different data storage regions. Example replication information may include a geographic location of a user associated with the record (e.g., the record may describe a media connection between a user device of the user and a media server), a demand for media stored in the record, and the like. The child record may then be replicated to the one or more different data storage regions without waiting for other child records or the parent record. An entry may be created in an index serving the one or more different data storage regions recording an identifier of the replicated child record. This index record may be used to later update the links to the child records within the parent record when it is replicated.

Upon receiving a notification that a parent record is available for replication, if the parent record is to be replicated to each data storage region that a child was replicated to, the system uses metadata of the child records within the parent record, in conjunction with a replication policy, to determine which data storage regions each child record was replicated to or is to be replicated to. Note that the parent record may become ready for replication before, during, or after the replication of all the child records. As noted previously, in some examples, the system waits until all child records are replicated before replicating the parent. To determine whether the child records have all been replicated, the replicator may use the unique identifier of each child record (obtained from the metadata in the parent record) to query an index serving the data storage regions to which each child record is to be replicated. If, for a particular data storage region, the index returns a result for the unique identifier of the child record, the system may determine that the child record was successfully replicated to that data storage region.

If all child records have been replicated to all data storage regions, a copy is made of the parent record and the copy is replicated to each data storage region. The copy of the parent record may have fields identifying local locations of the child records. These fields may be updated in the copy to refer to the replicated location based upon results returned from the indices. If the child records are not replicated, replication of the parent record may be delayed a specified amount of time. In examples in which the child records are all cross replicated to each data storage region to which sibling child records were replicated to, once the parent record is ready for replication, the system may kick off replication of other child records not already replicated to each particular data storage region. In some examples, one or more parent record copies may have information describing each location where a copy of one or more parent and/or child records are replicated for easily determining where records are located throughout a storage system.

As noted, in some examples, if the child records have not been completely replicated, the replicator may queue the processing of the parent document for a variable interval to allow for the replication of the child documents. For example, the interval may be set to a short amount of time for the initial wait period and then be increased for each subsequent wait period until the parent record is replicated. In some examples, the interval timer may be set based upon the number of child records. For example, the more child records the longer the interval timer. After the final interval, the replicator may determine that a child record was lost and initiate replication of the parent.

In other examples, rather than wait for each child record to be replicated, the parent may be replicated to each data storage region immediately. For example, the system may determine which data storage regions to replicate the parent based upon an analysis of the child information within the parent and the replication policy. In these examples, the child record may include a unique identifier of the parent record. Once the parent is replicated, upon receiving a subsequent child record, the replication system may replicate the child record to a second data storage region. As part of the replication of the child record, the index servicing the second data storage region may be checked to see if a parent identifier is present. If the parent identifier is present, it indicates that the parent record was already replicated. If the parent record was already replicated, the link to the child record in the replicated parent record may be updated. If the parent identifier is not present, it indicates that the parent record has not yet been replicated and thus no further action is needed.

This system solves the technical problem of efficient replication of hierarchical data records by the technical solution of asynchronous replication of child records independent of the replication of the parent record using metadata in the parent record and a data index. In some examples, the parent records may also be asynchronously replicated independent of the child records. The disclosed techniques allow for more efficient replication of large collections of hierarchical records by bypassing the traditional delays caused by waiting for the entire hierarchical record to become available. This also saves memory that would otherwise be used to cache these records or used to save state information while waiting for the record to be complete. Furthermore, in some examples, by not delaying the replication of the records until the entire hierarchical record is received, the replication system can schedule replication of the records at a convenient time (which may still be before the receipt of the entire hierarchical record) when computing resources are available. Additionally, by allowing records to be replicated upon arrival at the replication system, network and processor usage may be spread out over time, rather than being bursty. This improves the operation of the computer network between data storage regions as well as reduces the amount of peak processing power necessary on the replication system.

Additionally, the disclosed techniques of using hierarchical records to store data about and media from network-based meetings allows for increased participation in these meetings without additionally requiring a massive increase in computational power to handle these meetings. Further, by utilizing the above replication scheme, the records storing media may be replicated to one or more data storage regions with computing resources near a (geographic or network) location that is closer to a demand for this media. This allows for delivering this media in a faster manner with less latency. This also reduces network traffic as it allows for a more direct route.

FIG. 1 illustrates a schematic of a parent record 105 and a corresponding child record 120 according to some examples of the present disclosure. Parent record 105 may be a parent record to one or more child records, such as child record 120. Parent record 105 may have a set of one or more parent data fields 110. For example, if the parent record 105 is a record of a network-based meeting, parent data fields 110 may include fields such as a meeting identifier; a start time; an end time; links to (or copies of) media shared before, during, and after the meeting; links to media that is a recording of the meeting; copies of media; metrics of the communication quality; and the like. In some examples, the parent data fields 110 may include a parent identifier that uniquely identifies the parent record 105. Each parent record may have a set of one or more child metadata structures 112A, 112B-112N. Child metadata structures may include an identifier of the child 114, a child record version identifier 116, a child link 118 that links to a local copy of the child (local to the data storage region that the parent record is stored at), and child replication information 121 which may be used, along with a replication policy to determine whether the child should be replicated and where the child should be replicated to. Child replication information 121 is any information used to determine, alone, or in conjunction with other information (such as a replication policy) whether, and/or where, to replicate the child record. In some examples, the child replication information 121 may be a location, such as a location of a user associated with the child record. In other examples, the child replication information 121 may be media information related to a geographic demand for the media (e.g., which geographic regions are, or are likely to, request the media within the child record). In some examples, the demand may be a past demand; in other examples, the demand may be an anticipated demand based upon a location of users attending or associated with the meeting. For example, if a threshold number of members of the meeting are in a particular location, one or more media files of the meeting may be replicated to the location.

In some examples, where the hierarchical record is for a network-based meeting, each child record may include information about each participant's connection with a media server providing the meeting. For example, if there are twenty participants in the meeting, there would be one parent record and twenty child records. In these examples, the child replication information may be a location of a user described by the child record for the meeting.

Child record 120 may include the same fields as the child metadata structures 112A-112N with values the same as the corresponding entry in the parent record 105. For example, a child identifier field 122, child version identifier 124, and child replication information 126. In addition, the child record 120 may have child data fields 132. In the example of the network-based meeting, the child data fields 132 may identify the endpoints identifiers (e.g., the client and the media processor), may store or include quality metrics of the meeting, media, links to media, or the like. In examples in which both parent record 105 and child record 120 can be asynchronously replicated, child record 120 may also have parent information 130 that identifies or may be used to identify the parent record 105, such as a unique identifier of the parent.

Figure 2:
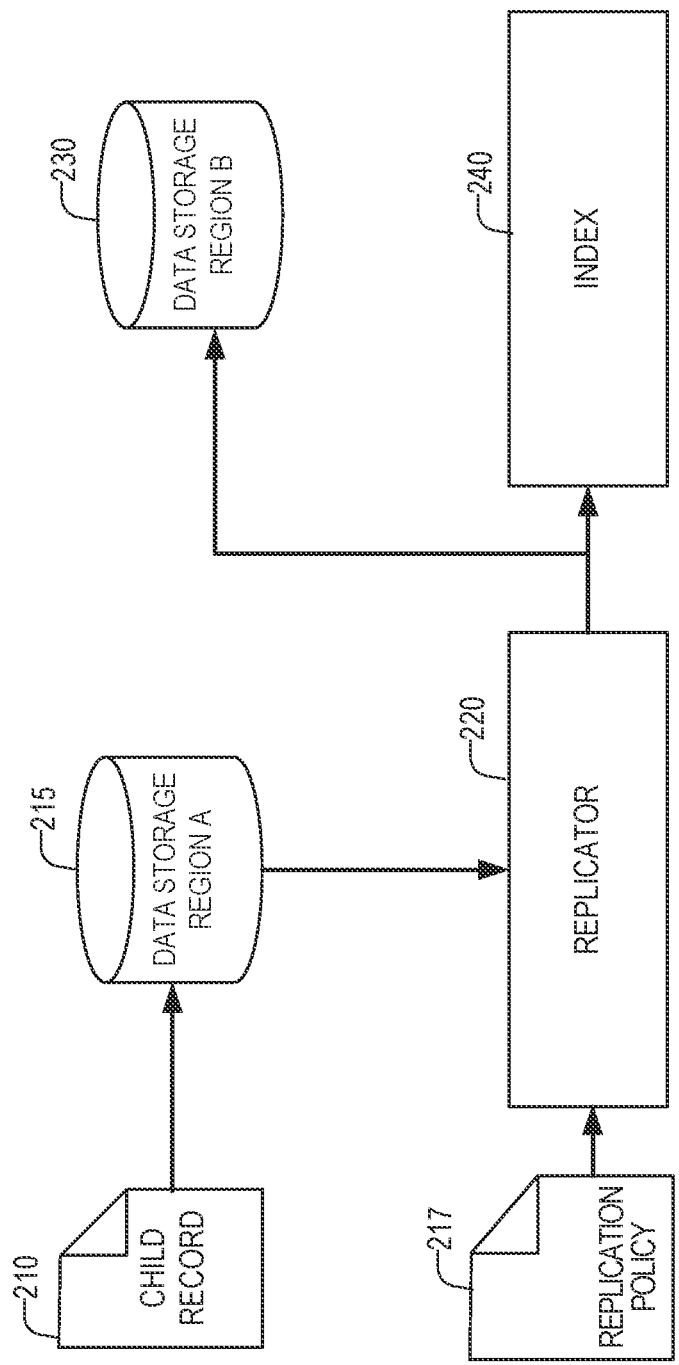
FIG. 2 illustrates a schematic of a data replication system replicating a child record according to some examples of the present disclosure.

FIG. 2 illustrates a schematic 200 of a data replication system replicating a child record according to some examples of the present disclosure. The child record 210 is created and stored in data storage 215 of a first data storage region, region A. The replicator 220 identifies that child record 210 is ready for replication. For example, replicator 220 may monitor the data storage region A 215 for new records, or the data storage device or another process may notify the replicator 220 of the creation of the child record 210. Replicator 220 then determines, from the replication information (e.g., child replication information 128) and a replication policy 217 whether this record needs to be replicated and to which data storage regions. In the example of FIG. 2, the replicator 220 determines that this record is to be replicated to data storage region B.

Replicator 220 may cause the child record 210 to be replicated to the data storage 230 in data storage region B without first receiving either the parent record, or the complete record set, including sibling records (if any). Data storage 230 may include one or more data storage devices. Replicator 220 also causes the copy of the child record 210 stored in the data storage 230 of data storage region B to be indexed in index 240. For example, the child identifier may be used as a lookup value in the index. The child identifier may be globally unique across the entire data storage system.

As used herein, a data storage region comprises one or more data storage devices or clusters in one or more logically grouped data centers. In some examples, the logical grouping may be based upon a geographic location (e.g., a geographical region such as North America, Europe, South America, Asia, or the like) or based upon a physical or logical position of the data center or the components thereof in a network structure. Replicator 220 may be at data storage region A, data storage region B, functions of replicator 220 may be performed at data storage region A and data storage region B or may be in a different region altogether. In some examples, one or more components of FIG. 2 may be an edge server of a cloud platform.

Figure 3:
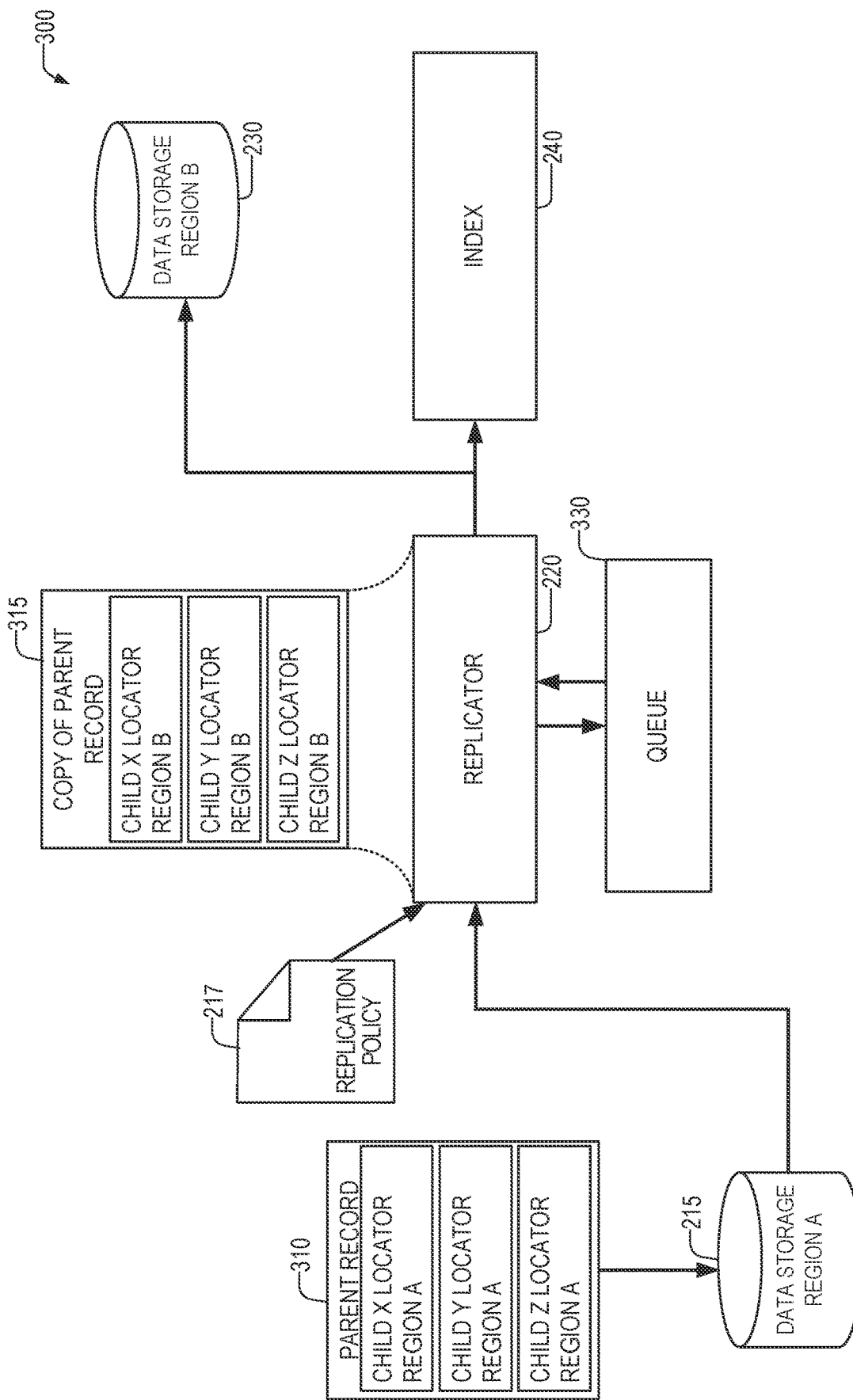
FIG. 3 illustrates a schematic of the data replication system replicating a parent record according to some examples of the present disclosure.

FIG. 3 illustrates a schematic 300 of the data replication system replicating a parent record according to some examples of the present disclosure. In the example of FIG. 3, the parent record is replicated to the same data storage regions as any child record. In FIG. 3, the system also waits for the child record to be replicated before replicating the parent record. The parent record 310 may be created and may be stored in data storage of a first data storage region (e.g., a data storage of data storage region A 215). Replicator 220 may identify that parent record 310 is available for replication. For example, replicator 220 may monitor the data storage of data storage region A 215 for new records. In other examples, the data storage of data storage region A 215, or some other process, may send a notification to replicator 220.

Replicator 220 may read the parent record 310 and in particular, read the child metadata (such as child metadata structures 112A-112N) to determine if any of the child records need to be replicated. If any of the child records need to be replicated, the replicator 220 may determine that the parent record (and all child records) also need to be replicated to a different data storage region. That is, the parent record may be replicated to the same data storage regions to which the child records are, or need to be, replicated to. Replicator 220 may first determine whether all the child records are already replicated by determining if a record exists in the index 240 using the child identifier in the child metadata of the parent record 310. If the child records are not already all replicated, replication of the parent record 310 may be queued in the queue 330. Index 240 may serve one or more data storage regions. As shown, the index 240 may serve data storage region B.

Once all child records are replicated, a copy of parent record 310 is created 315 and the child links (e.g., child link 118) are updated to point to the copy of each child record in the data storage 230 of data storage region B as indicated by the index 240. Once the links to the child records are updated, the replicator 220 causes the copy of parent record 315 to be replicated to the data storage 230 of data storage region B and indexed into index 240.

Replicator 220 may be at data storage region A or data storage region B. In some examples, functions of replicator 220 may be performed at data storage region A and data storage region B.

In the example of FIG. 3, the parent record has three child records, child x, y, and z. In examples in which the child records are each replicated (from an original data storage region) to different data storage regions (e.g., first and second data storage regions) if the replicator 220 identifies that a first child record is replicated to a first data storage region and a second child record is replicated to a second data storage region, then the replicator 220 may initiate a replication of the second child record to the first data storage region and the second child record to the first data storage region. This may happen when the parent record is replicated. In other examples, the child records replicated to other regions may not be cross replicated. That is, the first child record that was replicated to the first data storage region may not be replicated to the second data storage region and the second child record that was replicated to the second data storage region may not be replicated to the first data storage region. In yet other examples, whether or not the child records are cross replicated may be determined based upon the replication policy 217. In some examples, one or more copies of the parent record 310 may be updated to track all the locations to which the parent record, and/or one or more (or all) of the child records have been replicated to.

Replication policy 217 may be a set of one or more rules that may utilize replication information, such as child replication information 121, and in some examples, other information, to determine whether the record is to be replicated and, if the record is to be replicated, to which data storage regions the record is to be replicated. An example replication policy 217 may be to read the replication information from one or more child records (e.g., child replication information 128) in the record and determine from that information if, and where, the record should be replicated to. For example, this replication information may comprise a location of a computing device that was a part of a network-based meeting described by the record. The replication policy may specify that the record is to be replicated to a data storage region servicing that location. The replication policy may make use of replication information from a single child record, or multiple child records. In some examples, the replication information may be based upon one or more legal regulations such as a General Data Protection Regulation (GDPR), Health Insurance Portability and Accountability Act (HIPAA) or the like. In some examples, the replication policy may restrict replication such that a record that would otherwise be replicated may not be replicated as a result of a replication policy (such as one based upon a legal obligation such as GDPR).

In yet other examples, replication information may include geographic demand information of media stored within the record. For example, an actual geographic demand, an anticipated demand, or the like. For example, a location of users within the network-based meeting may be used to determine data storage regions that are likely to have a high volume of access to the stored media (or contribute additional stored media after the meeting is over—such as for post meeting follow up). That is, the replication information may have location information of meeting participants and the replication policy may apply one or more thresholds (e.g., if a number of users for a particular region exceeds a threshold number, then the record is replicated to that region); or may replicate the record to the x regions with the greatest number of users (e.g., the x regions with the most users). In other examples, the replication information may be a count of the number of actual accesses of the media based upon geographical region. The replication policy may replicate the record to one or more of the regions that access the record the most. That is, the record may be replicated to a particular region if it is accessed by a user within that region over a specified threshold number of times. In other examples, the record may be replicated to a top x number of regions based upon where the users that most access the record are located.

As noted, in some examples, if the child records are not already all replicated, replication of the parent record may be queued in the queue 330. The system will periodically pull the parent record from the queue and check to see if all the child records have been replicated. Once the child records have all been replicated, the parent record is then replicated and the links to the child records in the replicated copy of the parent record are updated. A timer may be used to determine when to check the parent record in the queue to determine if the child records are all replicated. The timer may be specified and may be setup as a timer that progressively increases in length each time the parent record is checked, and the system determines that the child records are not yet replicated. For example, the first time may be set as one minute, the second check may be ten minutes, third check may be thirty minutes, and a fourth check may be sixty minutes. At a certain threshold number of checks, if the child records are not replicated, the system may declare an error and may give up or take some other action.

In other examples, if the child records are not already all replicated, the parent record may nonetheless be replicated to the data storage 230 of data storage region B. An identifier of the parent record may be inserted into the index 240. In these examples, and turning back to FIG. 2, upon replication of child records, the replicator 220 (which may be present at data storage region A, B. or some other region) may check the index 240 for the parent identifier (that may be present in the child record 210). If the replicator 220 finds the parent record, the replicator 220 may use the index to find the replicated copy in data storage region B and update the child link to the location of the replicated child record in data storage region B. Once all child records are replicated, all the links in the parent record for child records that are to be replicated will be updated. If the replicator 220 does not find the parent identifier, then that means that the parent has not yet been replicated and the links will be updated once the replicator 220 replicates the parent. In this manner, both parent and child records may be replicated when they come in, whether the parent record is first, in the middle, or after the child records.

Figure 4:
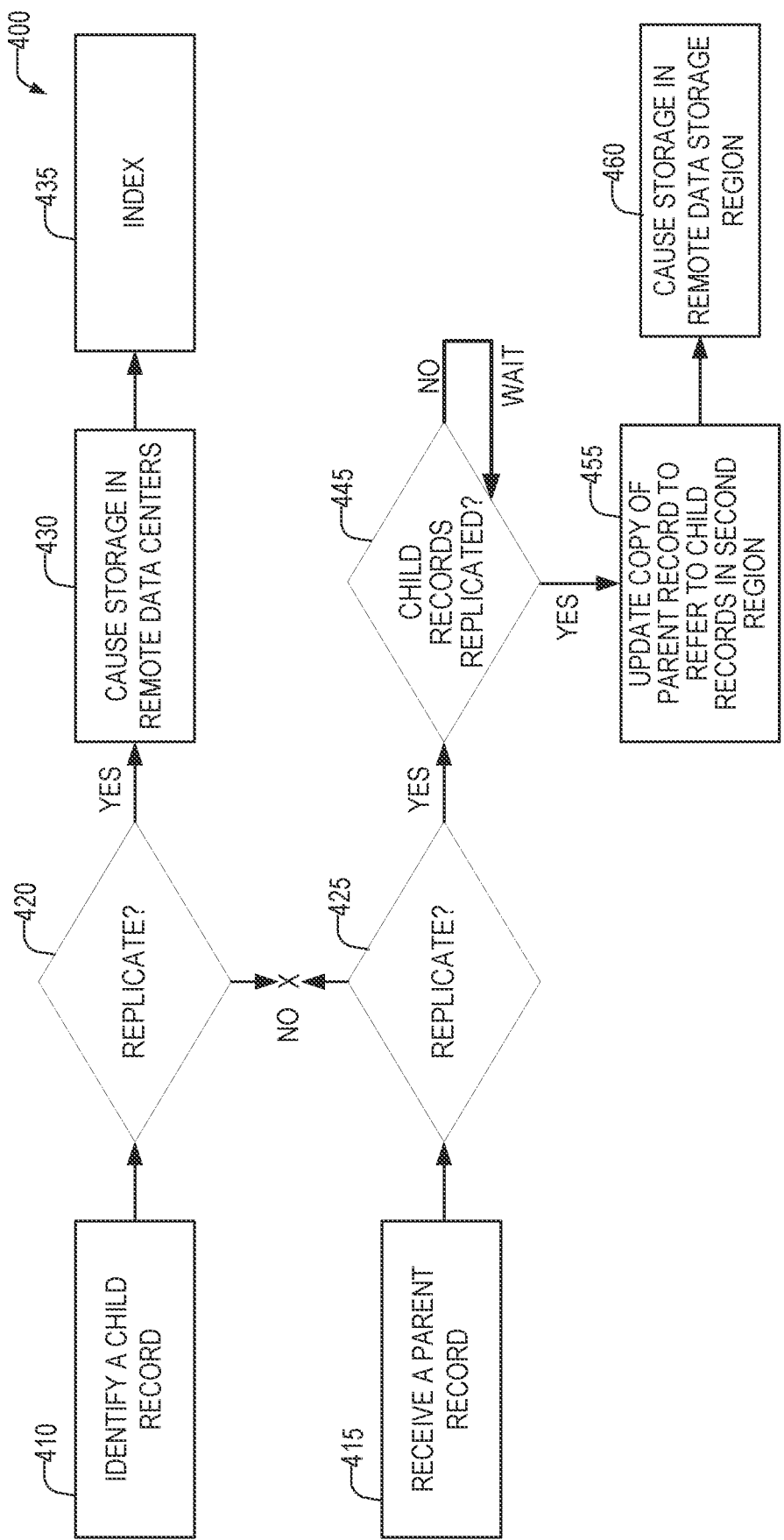
FIG. 4 illustrates a flowchart of a method of a replicator according to some examples of the present disclosure.

Turning now to FIG. 4, a flowchart of a method 400 of a replicator is shown according to some examples of the present disclosure. When a child record is created and identified by the replicator at operation 410, the replicator determines whether to replicate the record at operation 420. In some examples this determination is made using a replication policy and one or more fields of the child record such as replication information (such as location information). In examples in which the child record is a component record of a network-based meeting, the replication information may be a record of the location of a user end point of the meeting (e.g., based upon an IP address of a device used by the user mapped to a location or based upon a GPS receiver in the device, or the like). If the determination is not to replicate the child record, then the flow ends. Other example replication information may include media demand information.

Otherwise, if the child record is to be replicated, then at operation 430, the replicator may cause the child record to be stored in one or more data storage devices of one or more data storage regions determined by operation 420. Causing the child record to be replicated may include sending the child record to a replicator executing at the data storage region where the record is to be replicated. In other examples, causing the child record to be replicated may include sending a notification to a replicator executing at the data storage region where the record is to be replicated. The replicator executing at the data storage region where the record is to be replicated may then retrieve the record (e.g., from the data storage region that sent the notification).

At operation 435, one or more indexes are updated with entries for the original and/or replicated copies. In some examples, the index may index data in a single data storage region. In these examples, each index for each data storage region to which the child record is replicated may be updated at operation 435. In other examples, a single index may index data for multiple data storage regions. In these examples, the single index may be updated for all replicated copies. In still other examples multiple indexes may each index data for all data storage regions. The system may determine at operation 435 which indexes serve the regions to which the child record was replicated and appropriately index the child record in those indexes. In some examples, updating the index is done by messaging an indexing process on the index. In other examples, the indexing process may automatically determine that the child record was added through scanning of one or more data storage devices on the data storage region.

When a parent record is ready for replication by the replicator at operation 415, the replicator then decides whether to replicate the parent at operation 425. The replication may be made based upon a replication policy and based upon one or more fields in the parent record and/or one or child records (e.g., the replication information of the child records). In some examples, the parent may be replicated to the same data storage regions as one or more of the child records. If the parent record is not to be replicated, the flow may end. If the parent record is to be replicated, then at operation 445 a determination is made as to whether all the child records are already replicated. This determination may be made based upon determining that all child records to be replicated to that storage region have associated index entries in the data storage regions to which the child is supposed to be replicated. If not, then the system may queue the replication of the parent record until all the child records are replicated, or until a timer expires. If the timer expires, the system may reset the timer (but with a larger value) and wait for an additional interval. This may happen a specified number of times for a number of timer values until the system either gives up and labels the missing child record lost or triggers a manual replication of the child records that have not yet been replicated.

At operation 455, for each location to which the parent is to be replicated, a copy of the parent record is created. The metadata for each child record within the parent record may be updated to point to the local copy of each child record (e.g., child link 118 of FIG. 1). At operation 460, the copy of the parent record may be caused to be stored to the data storage device in a remote data storage region. As noted with respect to the child record, the parent record may be caused to be replicated by sending the parent record to the remote data storage region or may be caused to be replicated by sending a notice to the remote data storage region indicating that a record is ready for replication.

Figure 5:
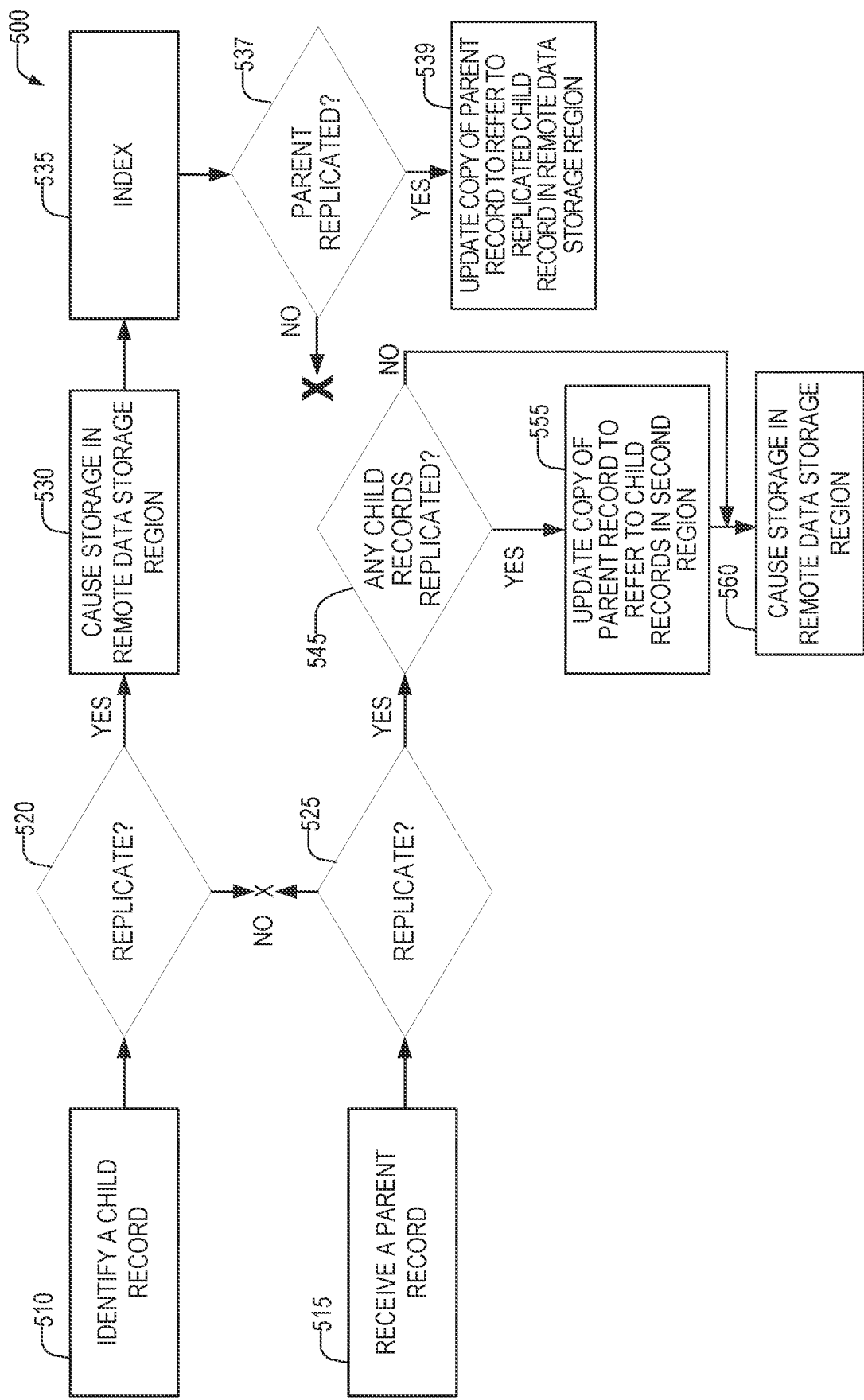
FIG. 5 illustrates a flowchart of another method of a replicator according to some examples of the present disclosure.

Turning now to FIG. 5, a flowchart of another method 500 of a replicator is shown according to some examples of the present disclosure. The method 500 allows for asynchronous replication of parent and child records as opposed to waiting for all child records to be replicated as in FIG. 4. When a child record is identified as ready for replication by the replicator at operation 510, the replicator determines whether to replicate the record at operation 520. In some examples this determination is made using a replication policy and one or more fields of the child record such as replication information (such as location information). In examples in which the child record is a component record of a network-based meeting, the replication information may be a record of the location of a meeting participant (e.g., based upon an IP address of a device used by the user or based upon a GPS receiver in the device, or the like). If the determination is not to replicate the child record, then the flow ends.

Otherwise, if the child record is to be replicated, then at operation 530, the replicator may cause the child record to be stored in one or more data storage devices of one or more data storage regions determined by operation 520. Causing the child record to be replicated may include sending the child record to a replicator executing at the data storage region where the record is to be replicated. In other examples, causing the child record to be replicated may include sending a notification to a replicator executing at the data storage region where the record is to be replicated. The replicator executing at the data storage region where the record is to be replicated may then retrieve the record (e.g., from the data storage region that sent the notification).

At operation 535, one or more indexes are updated with entries for the replicated copies. In some examples, the index may index data in a single data storage region. In these examples, each index for each data storage region in which the child record is stored may be updated at operation 535. In other examples, a single index may index data for multiple data storage regions. In these examples, the single index may be updated for all replicated copies. In still other examples multiple indexes may each index data for all data storage regions. The system may determine at operation 535 which indexes serve the regions to which the child record was replicated and appropriately index the child record in those indexes.

At operation 537, the replicator process may determine if the parent record has already been replicated to one or more of the destination data storage regions identified at operation 520. For example, by utilizing an identifier of the parent record stored within the child record and consulting an index of the remote data storage region to determine whether the identifier is present within the index. If the parent has already been replicated, then at operation 539, the copy of the parent record stored in the destination data storage regions where it is replicated may be updated to change the links to the local copies of the child records in those destination data storage regions. If the parent is not replicated, then the flow may end.

When a parent record is identified as ready to be replicated by the replicator at operation 515, the replicator then decides whether to replicate the parent at operation 525. The replication may be made based upon a replication policy and based upon one or more fields in the parent record and/or child record (e.g., replication information). For example, the replication policy may be to replicate the data to data storage regions servicing locations indicated by the replication information within the parent record, or the indicated in replication information in one or more child metadata records. As noted, in some examples, the parent record may be replicated to each data storage region that a child was replicated to.

If the parent record is not to be replicated, the flow may end. If the parent record is to be replicated, then at operation 545 a determination is made as to whether any child records are already replicated. This determination may be made based upon determining whether child records have associated index entries in the data storage regions to which the child is supposed to be replicated. If not, then the system may proceed to operation 560.

At operation 555, for each location to which the parent is to be replicated, a copy of the parent record is created. The metadata for child records within the parent record that have already been replicated may be updated to point to the local copy of each child record. At operation 560, the copy of the parent record may be caused to be stored to the data storage device in a remote data storage region. As noted with respect to the child record, the parent record may be caused to be replicated by sending the parent record to the remote data storage region or may be caused to be replicated by sending a notice to the remote data storage region indicating that a record is ready for replication.

In some examples, one or more of the parent and/or child records may need to be updated after replication. For example, data may change in one or more fields for either the parent and/or the child. In other examples, additional child records may be added. Such changes may need to be replicated to other copies of the parent and/or child data structures. In these examples, the changes may be replicated asynchronously. For example, updated parent and/or child records may be replicated as previously described. The updated records may be stored in addition to, or may replace, the old records.

In still other examples, in order to update the records more efficiently, a parent record may have links to the other parent records within other data storage devices of other data storage regions. This allows the replicator to quickly locate the other records to update those records when a change to the record is identified.

Figure 6:
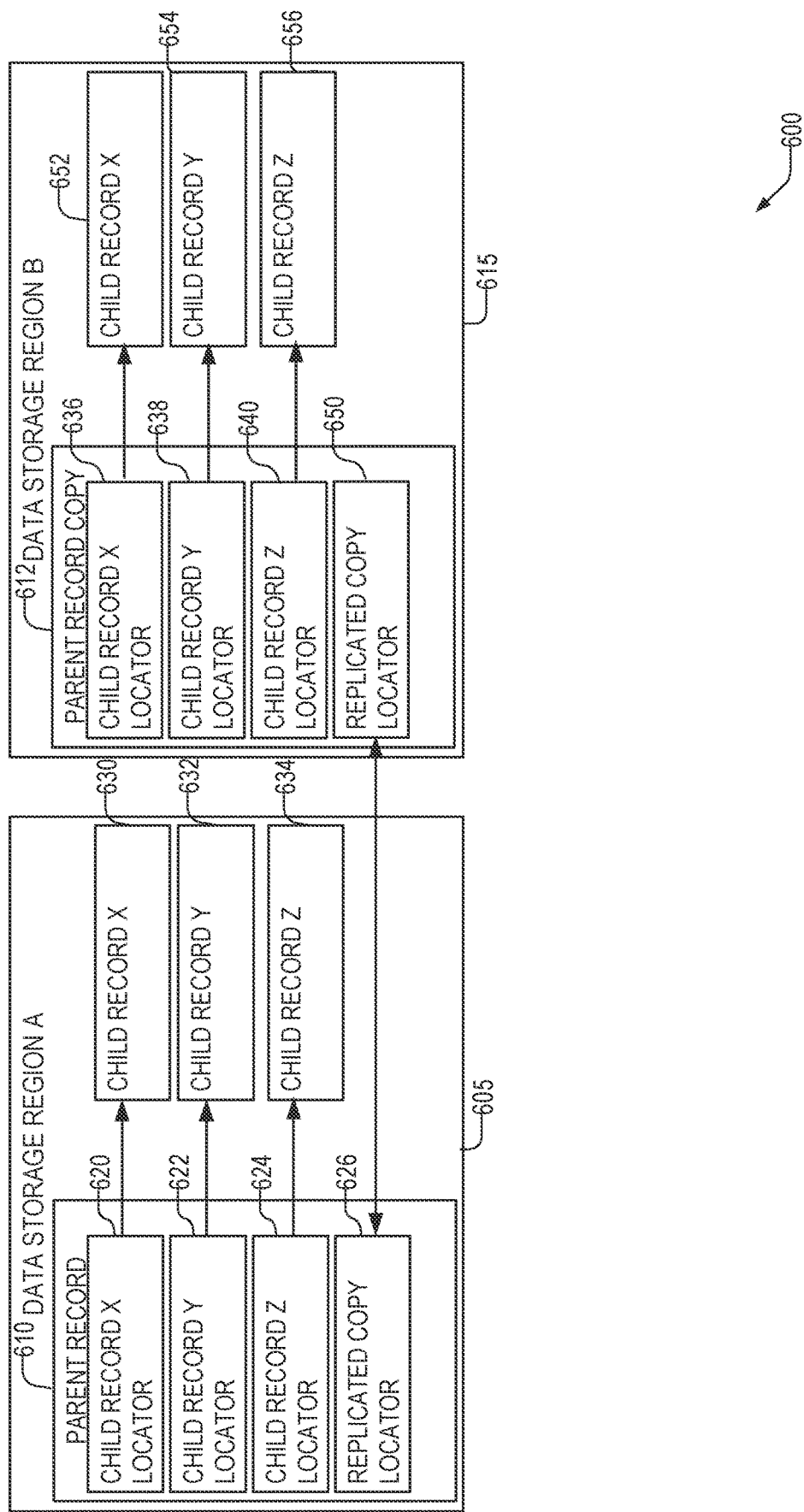
FIG. 6 illustrates a schematic diagram of a parent record with links to other parent records according to some examples of the present disclosure.

FIG. 6 illustrates a schematic diagram 600 of a parent record with links to other parent records according to some examples of the present disclosure. As with other examples, the parent records have metadata that provides a location of child records within the data storage region. For example, parent record 610, which is stored on a data storage device of data region A 605, may have a parent record copy 612 stored on a data storage device of data storage region B 615 that was replicated from the data storage region A 605. Parent record 610 may have metadata for each child record, including a child locator that points to a local (e.g., within a same data storage region) location of each child record. For example, child record X locator 620 may point to one or more locations on one or more data storage devices in data storage region A on which the child record X 630 is located. Similarly, child record Y locator 622 may point to one or more locations on one or more data storage devices in data storage region A on which the child record Y 632 is located. Finally, child record Z locator 624 may point to one or more locations on one or more data storage devices in data storage region A on which the child record Z 634 is located.

Similarly, the parent record copy 612 stored on one or more storage devices of data storage region B 615 may have metadata describing one or more child documents. For example, child record X locator 636 may point to one or more locations on one or more data storage devices in data storage region B on which the child record X 652 is located. Similarly, child record Y locator 638 may point to one or more locations on one or more data storage devices in data storage region B on which the child record Y 654 is located. Finally, child record Z locator 640 may point to one or more locations on one or more data storage devices in data storage region B on which the child record Z 656 is located.

In some examples, if a change to parent record copy 612 is detected at data storage region A. 605; or data storage region B, 615; the replicator (which may be at either or both of the data storage regions) may individually examine the child metadata in the parent record in conjunction with the data replication policy to determine which data storage regions the parent record copy 612 and child records 630, 632, and 634 were replicated to. The replicator may then replicate any changes to those data storage regions.

In other examples, when a parent record is replicated to another data storage region, links to each data storage region that has a replicated copy may be created within one or more copies of the parent record (including the original parent record). For example, the parent record 610 and the parent record copy 612 may have links to each other in the replicated copy locators 626 and 650. This enables updates received at either the data storage region A 605 or the data storage region B 615 to be replicated to the other data storage regions quickly without having to investigate the metadata of the child records. The replicated copy locator 626 may contain a link to each copy of the parent record in one or more data storage regions. In FIG. 6, there are two copies—the original parent record 610 and the parent record copy 612 and thus, the replicated copy locator 626 points to the parent record copy 612 and the replicated copy locator 650 points to parent record 610. In other examples, where there are more than two copies, multiple replicated copy locators may be stored within each copy of the parent record, each of the replicated copy locators points to a different copy in a different data storage region. Thus, if there are three copies of the parent record, there may be two replicated copy locators in each parent record. A first replicated copy locator points to a first copy, a second replicated copy locator points to a second copy.

Figure 7:
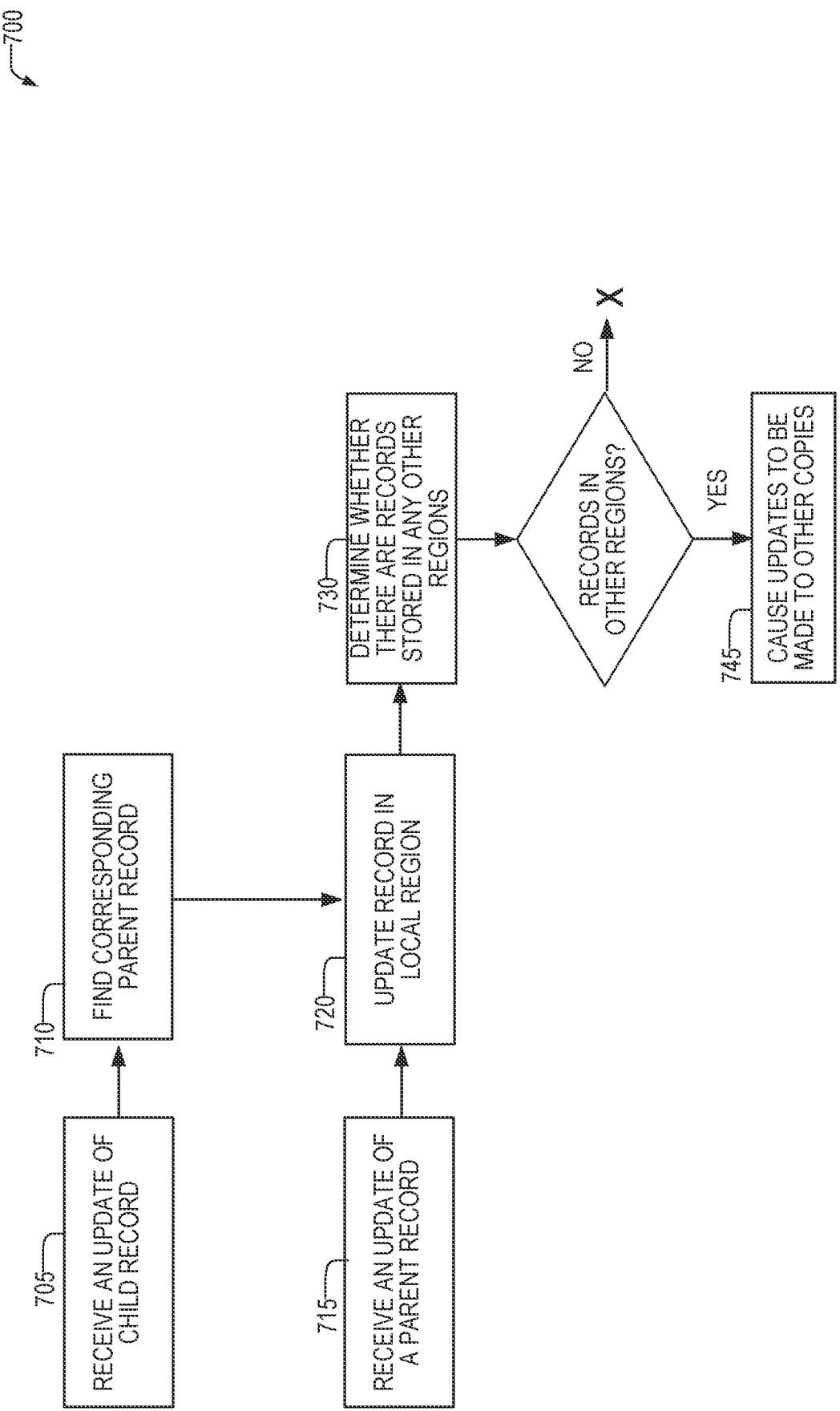
FIG. 7 illustrates a flowchart of a method of updating a parent and/or child record according to some examples of the present disclosure.

FIG. 7 illustrates a flowchart of a method 700 of updating a parent and/or child record according to some examples of the present disclosure. At operation 705 if an update of a child record is received, then a corresponding parent record may be identified at operation 710. For example, by identifying the child identifier in the record and searching for parent records with metadata with a matching child identifier. In other examples, the child record may have an identifier of the parent. In still other examples, the parent record is not found at operation 710 and flow proceeds directly to operation 720. The parent record may have information on other data storage regions to which the records are replicated.

If an update of the parent record is received at operation 715, or once the corresponding parent record is identified (or the operation 710 is skipped), the record stored in the local region is updated at operation 720. Similarly, for a child record, once the parent is updated, the local child record may be updated at operation 720. Operations 720, 730, and 745 apply whether the record is a parent or child record. At operation 730 the replicator may identify whether there are other records stored in any other data storage regions. As noted, this may be performed by identifying links to these other records in the parent record. In other examples, the replicator may examine the metadata of the child records and evaluate, based upon the replication policy, whether the data was replicated and to which regions. If there are no replicated records, then the method 700 may terminate. If there are other replicated records, then the updates may be caused to be made to the other copies at operation 745. For example, by sending a message to the data storage regions requesting the update (which may include the update).

Figure 8:
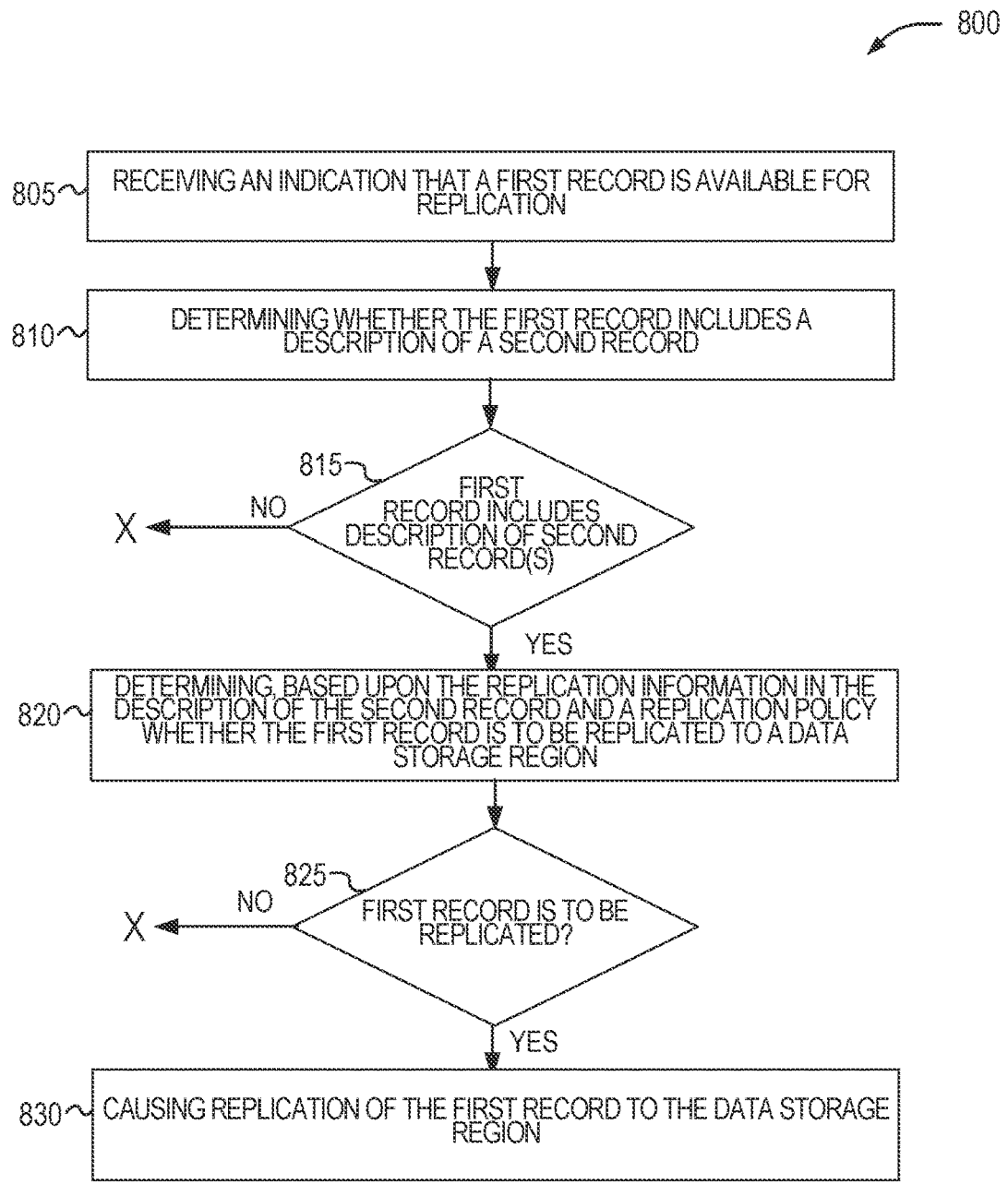
FIG. 8 illustrates a flowchart of a method of replicating a parent record of a hierarchical record according to some examples of the present disclosure.

FIG. 8 illustrates a flowchart of a method 800 of replicating a parent record of a hierarchical record according to some examples of the present disclosure. At operation 805 the system may receive an indication that a first record is available for replication. For example, the system may receive the record from another device or component (e.g., over a network) or may receive an indication that the record was created and a replicator may then retrieve the record or a portion of the record (e.g., the metadata). At operation 810 the replicator may determine whether the first record includes a description of a second record such as a child record. That is, the replicator may determine if this record is a parent record of a hierarchical record. The description of the second record may include metadata including child replication information such as location data and a record identifier identifying the second record. The second record may be a child record of a first record.

If, at operation 815, the first record does not include a description of one or more second records, then the flow may terminate. If, at operation 815, the first record includes a description of one or more second records, then at operation 820, the system may determine, based upon the replication information (e.g., geolocation data) in the description of the second record in the first record and a replication policy whether the first record is to be replicated to a data storage region.

If, at operation 825, the first record is not to be replicated, then the method 800 may terminate. If, at operation 830, the first record is to be replicated, then the system may cause replication of the first record to the data storage region. In some examples, the method 800 is performed in the data storage region or in a second data storage region.

Figure 9:
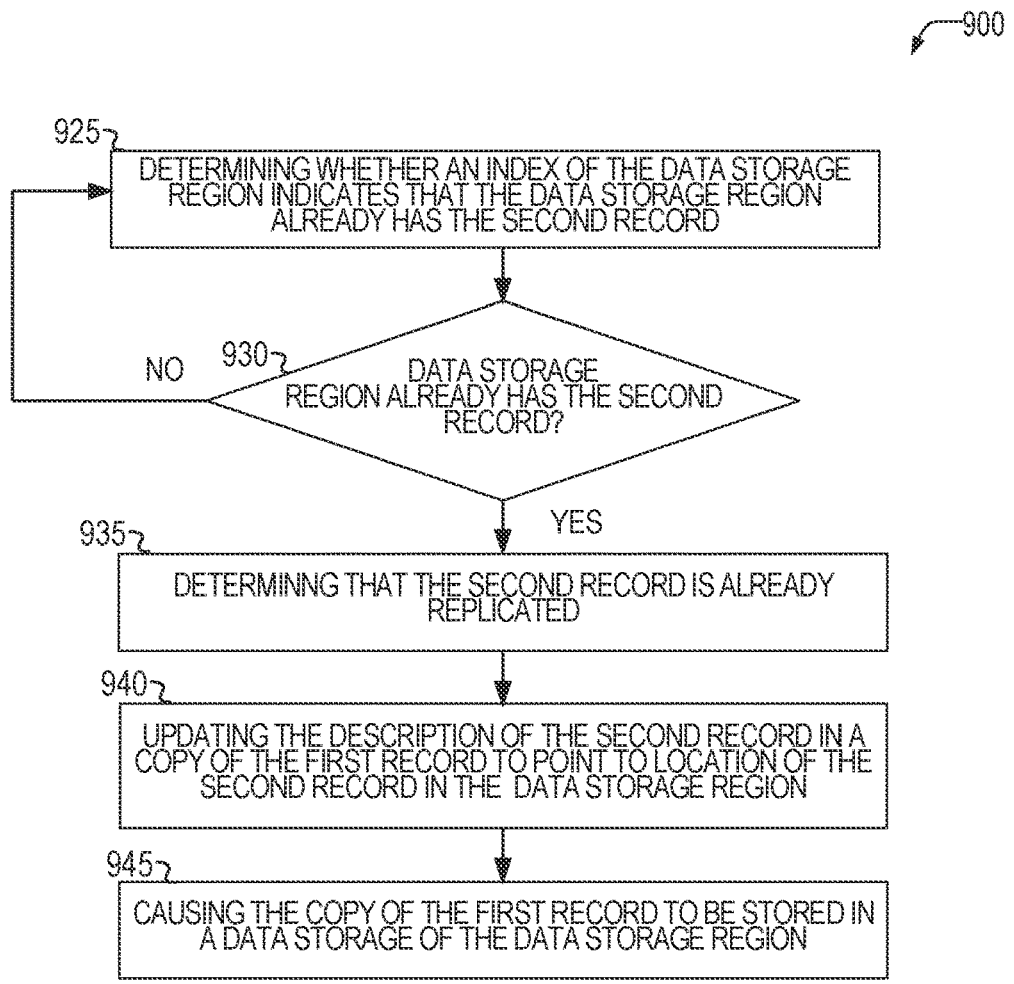
FIG. 9 illustrates a flowchart of a method of the operation of causing replication of the first record according to some examples of the present disclosure.

FIG. 9 illustrates a flowchart of a method 900 of the operation of causing replication of the first record to the data storage region according to some examples of the present disclosure. Method 900 may be one example method of operation 830 of FIG. 8. At operation 925, the replicator may determine whether an index of the data storage region indicates that the data storage region already has the second record. If not, then the system may wait a specified amount of time. If at operation 930, the data storage region already has the second record, then at operation 935 the system determines that the second record is already replicated. At operation 940, the system may update, in a copy of the first record, a description of the second record to point to locations of the second records in the data storage region. At operation 945, the replicator may cause the copy of the first record to be stored in a data storage device of the data storage region.

Figure 10:
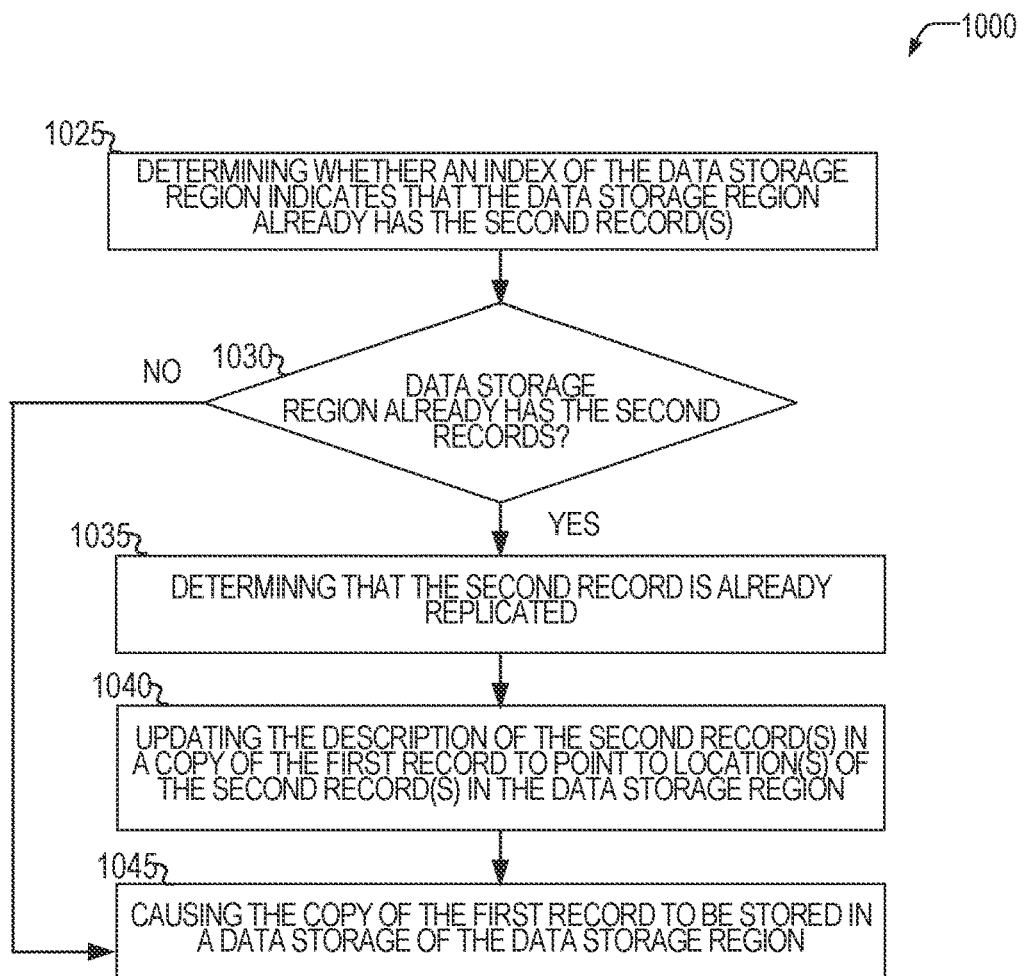
FIG. 10 illustrates a flowchart of a method of the operation of causing replication of the first record according to some examples of the present disclosure.

FIG. 10 illustrates a flowchart of a method 1000 of the operation of causing replication of the first record to the data storage region according to some examples of the present disclosure. Method 1000 may be one example implementation of operation 830 of FIG. 8. FIG. 10 differs from FIG. 9 in that the child records may include an identifier of the parent record and the parent record may be replicated independent of the child record. The links to the child records in the parent record may be updated once the parent record is replicated. At operation 1025, the replicator may determine whether an index of the data storage region indicates that the data storage region already has the second record (e.g., the child record). If not, then the method flow may proceed to operation 1045. If at operation 1030, the data storage region already has the second record, then at operation 1035 the system determines that the second record is already replicated. At operation 1040, the system may update, in a copy of the first record, a description of the second record to point to locations of the second records in the data storage region. At operation 1045, the replicator may cause the copy of the first record to be stored in a data storage device of the data storage region. As previously noted, FIGS. 8-10 may be performed by the data storage region, a second data storage region, or partially at the data storage region or the second data storage region.

Figure 11:
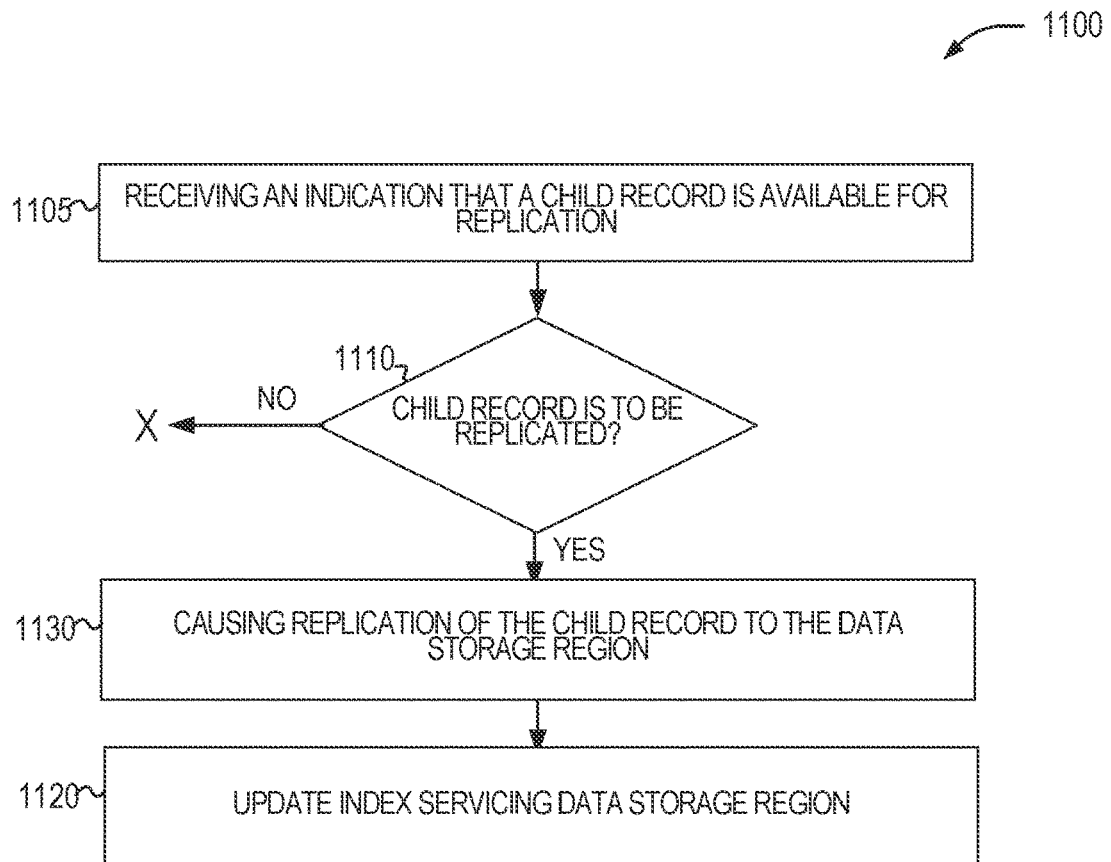
FIG. 11 illustrates a flowchart of a method of replicating a child record of a hierarchical record according to some examples of the present disclosure.

FIG. 11 illustrates a flowchart of a method 1100 of replicating a child record of a hierarchical record according to some examples of the present disclosure. At operation 1105, the system may receive an indication that a child record is available for replication. For example, the system may receive the record from another device or component (e.g., over a network) or may be receive an indication that the record was created and the replicator may then retrieve the record or a portion of the record (e.g., the metadata).

At operation 1110, the system may determine whether the child record is to be replicated and if so, the replicator determines the data storage regions to which the child record is to be replicated. This may be accomplished using the child replication information in the child data structure and the replication policy. If the child record is not to be replicated, then the method 1100 may terminate. If the child record is to be replicated, then at operation 1130, the replicator may cause replication of the child record to the indicated data storage region(s). For example, by copying the record to one or more data storage devices of the data storage region(s). In other examples, the replicator may notify one or more components of the data storage region(s) to copy the record. At operation 1120, the replicator may cause an index to be updated that indexes records for the data storage region(s) to index the replicated copy of the record.

Figure 12:
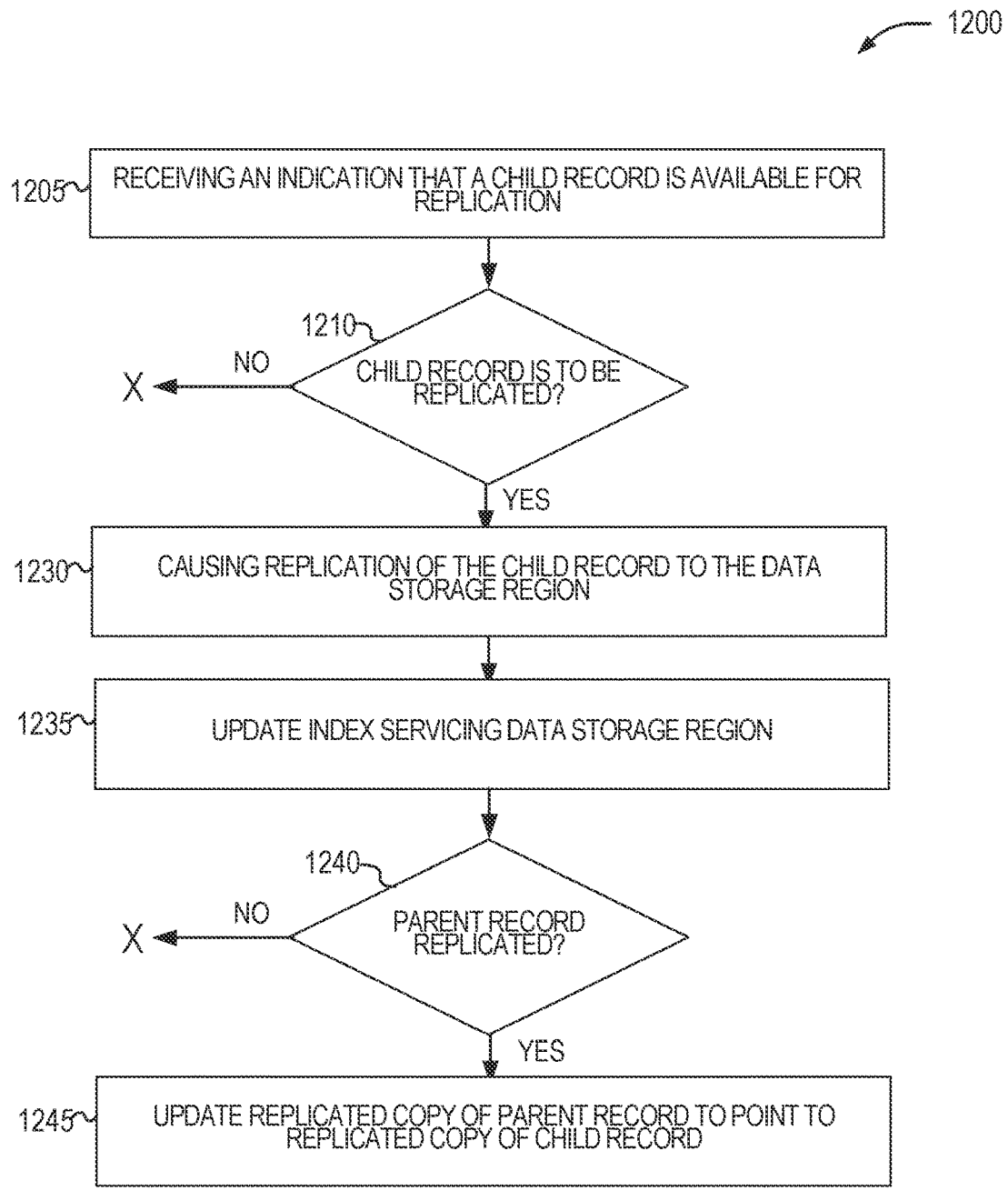
FIG. 12 illustrates a flowchart of a method of replicating a child record of a hierarchical record according to some examples of the present disclosure.

FIG. 12 illustrates a flowchart of a method 1200 of replicating a child record of a hierarchical record according to some examples of the present disclosure. FIG. 12 allows for replication of the parent separately from the child record and includes additional checks to see if the parent record was replicated and if so, to update the replicated copy of the parent record. At operation 1205, the system may receive an indication that a child record is available for replication. For example, the system may receive the record from another device or component (e.g., over a network) or may be receive an indication that the record was created and the replicator may then retrieve the record or a portion of the record (e.g., the metadata). In some examples, as part of operation 1205, to determine that the record is a child record, the system may determine that the record includes a description of the parent record (e.g., an identifier of the parent record or some other indicia that this is a child record).

At operation 1210, the system may determine whether the child record is to be replicated and if so, the replicator determines the data storage region(s) to which the child record is to be replicated. This may be accomplished using the child replication information in the child data structure and the replication policy. If the child record is not to be replicated, then the method 1200 may terminate. If the child record is to be replicated, then at operation 1230, the replicator may cause replication of the child record to the indicated data storage region(s). For example, by copying the record to one or more data storage devices of the data storage region(s). In other examples, the replicator may notify one or more components of the data storage region(s) to copy the record. At operation 1235, the replicator may cause an index for the data storage region(s) to be updated to index the replicated copy of the record.

At operation 1240, the replicator may determine whether the parent record has been replicated. For example, by using an index of the data storage region(s) and an identifier of the parent. The identifier of the parent may be stored in the child record or may be looked up by searching for a corresponding parent record that has metadata identifying the child record. If there is no record for the parent record in the index, then the parent record is not already replicated, and flow may terminate. If there is a record for the parent, then the parent was replicated first and at operation 1245, the replicator may cause the replicated copy of the parent stored in the data storage region(s) to be updated with the location of the child record in the data storage region(s). FIGS. 11 and 12 may be performed by the data storage region, a second data storage region, or partially at the data storage region or the second data storage region.

In some examples, replicating the parent first prior to the child records may cause issues if not all child records are replicated. That is, the links in a replicated parent record to the child records that have not been replicated may be incorrect. In some examples, prior to replication of the parent, all the child records that are not yet present in the data storage region(s) may be set to a value indicating that they are not yet replicated. In some examples, a timer may also be started. Upon replication of the last child record—which may be determined by checking to see if all child links have valid values, the timer may be reset. If the timer expires, the system may act to either initiate replication of the child records that were not replicated or declare an error condition.

In some examples, not all child records of a same parent record are replicated to all data storage regions. That is, if a parent record has two child records, and the replication policy states that the first child record is to be replicated to a first data storage region and the second child record is to be replicated to the second data storage region, then the parent record may be replicated to both the first and second data storage regions. The first child record may be replicated to the first data storage region but not the second data storage region and the second child record may be replicated to the second data storage region but not the first data storage region. In other examples, other combinations may be possible (e.g., the first child record may be replicated to both regions, but the second child record is not). In order to handle these scenarios, not having a valid link to a local copy of the child record in the parent data structure may not produce an error condition and may be normal. In still other examples, in these cases, a special value may indicate that a particular child record was purposefully not replicated.

Figure 13:
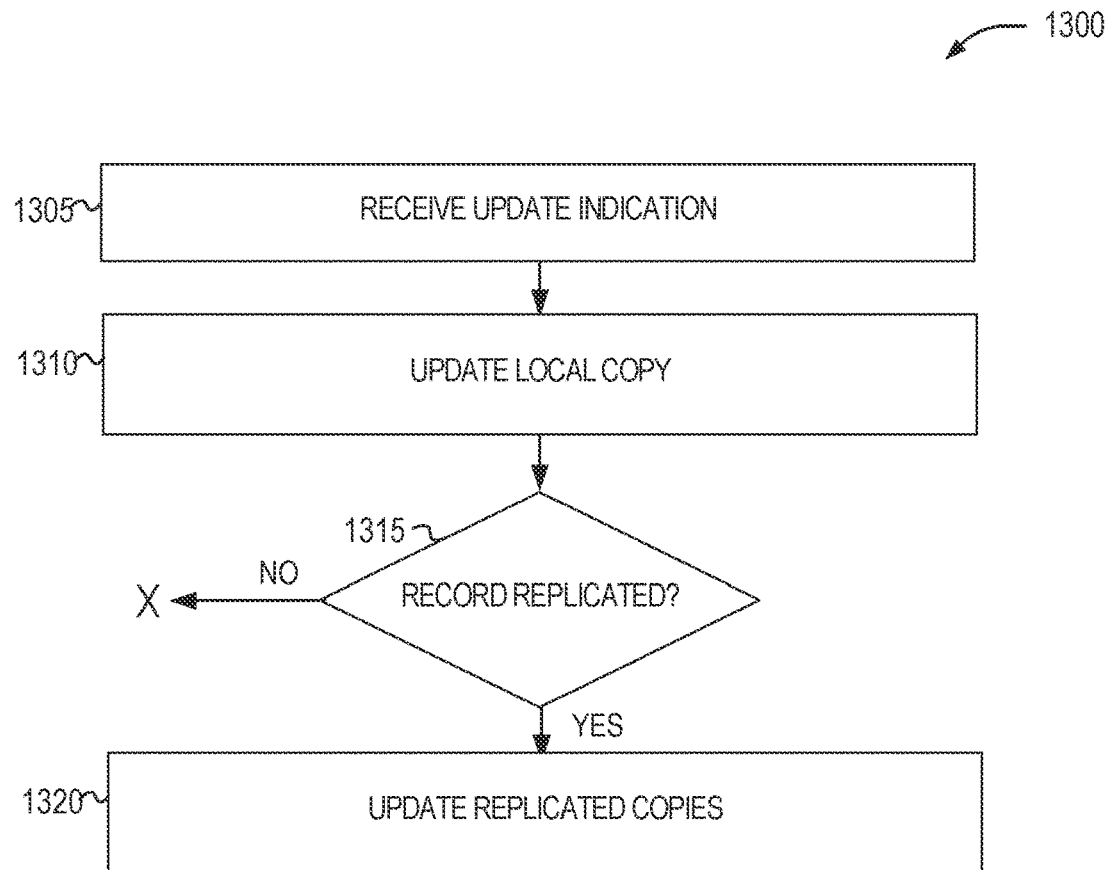
FIG. 13 illustrates a flowchart of a method for propagating updates to a replicated hierarchical record according to some examples of the present disclosure.

FIG. 13 illustrates a flowchart of a method 1300 for propagating updates to a replicated hierarchical record according to some examples of the present disclosure. At operation 1305, the replicator may receive an update indication. The update may specify one or more changes to the record (either a parent or child record), or may be a new record to replace the old record. At operation 1310, the system may update the local copy of the record (if this has not already been done). At operation 1315 the system may determine whether the record was replicated to one or more other data storage regions. If the record is a child record, this may be determined based upon the child replication information in the child record. In examples in which the child record may be replicated to other data storage regions because of child replication information of sibling records, the replicator may determine other data storage regions by locating the parent record and then using the child metadata and the replication policy of the parent record to determine all replication locations. For parent records, the replication policy and the replication locations may be used to determine the replication locations. In other examples, links to other replicated copies may be used (e.g., replicated copy locator 626 and 650 of FIG. 6). For example, the parent record of a child may be determined and the parent record may have links to child records. If there are no replications, then the method 1300 may end. At operation 1320, the replicated copies identified at operation 1315 may be updated.

Certain regulations in certain geographic regions may allow individuals to have access to, or delete, data describing them or their activities. For example, the European Union's General Data Protection Regulation (GDPR). The data structure described herein allows for easily tracing data across one or more data storage regions. In some examples, the parent record data fields (e.g., parent data fields 110) may have a unique identifier of one or more users. In some examples, where the child records are user specific, the child metadata structure 112A may have user identifiers for easy access. When a user desires to see data about them, the user's identifier is used to select parent records corresponding to the user. The child metadata in the parent records and the replication policy may be used to easily find data storage regions that both the parents and their children were replicated to. This data may then be obtaining for viewing, modified, or deleted from the data storage regions.

In the case of a network-based meeting, the parent record 105 may store identifiers of all participants in the parent data fields 110. Instead, or additionally, in other examples, each component (child) metadata structure 112A may have the identifier of the participant of that component (e.g., a connection to a media server for a real-time communication component of the meeting) as part of the metadata. Thus, the replicator can find the parent records associated with a particular user identifier by searching the parent record (either the parent data fields or the child metadata, or both). Once the parent record is located, the parent record's links to the child records may be used to find all child records in all locations.

When the hierarchical records represent network-based meetings these communications (e.g., network-based meeting) may be treated as an object. For example, the parent record may be a group object such as a meeting object and the child structures may be components of the meeting such as media (such as media shared before, during, and after the meeting; and/or audio, video, or audiovideo of the meeting), connections between users and a media server for each participant in the meeting (a session record), and the like. As noted, the parent and/or child documents may store metadata about the meeting such as quality metrics, and the like. Additionally, or instead of this metadata, shared documents, videos (including those captured of participants), notes, virtual whiteboard drawings, chat sessions, and other meeting media may be stored within the hierarchical record. For example, within the parent, child, or a combination of the parent and/or child records. For example, audio of a participant may be stored within a child record. Similarly, shared documents, and the like may be stored either in the parent object or within each child document.

Use of the hierarchical structure along with the replication scheme described herein may promote sharing and collaboration between participants, while still complying with privacy laws. For example, it allows replication of records that have shared media across different data storage regions so that users may access them quickly as the shared media may be stored in a local data storage region. As noted, records including media may be replicated to geographic regions that have, or are expected to have high demand to view or play this media. Despite this, the ability to update, locate, and modify the records in a quick and efficient manner allows for easier compliance with privacy regulations. Furthermore, by using the disclosed techniques to replicate the hierarchical records more efficiently, these records may comply with data privacy regulations with low impact to computing resources. In some examples, the replication policy may specify one or more privacy regulations that prohibit, require, or allow replication to one or more data storage regions.

Figure 14:
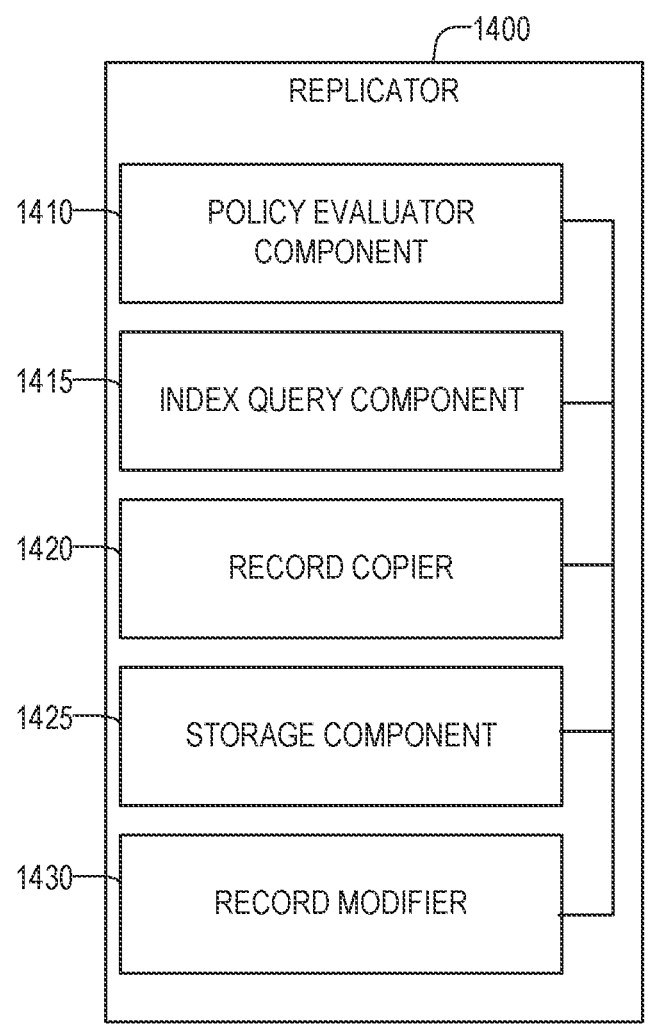
FIG. 14 illustrates a logical diagram of a replicator according to some examples of the present disclosure.

FIG. 14 illustrates a logical diagram of a replicator according to some examples of the present disclosure. Replicator 1400 may be an example of replicator 220 and may perform the flows and methods of FIGS. 2-13. Replicator 1400 may have a policy evaluator component 1410 which may determine an applicable replication policy (e.g., from a list of replication policies). The system may have multiple replication policies that have applicability rules that may specify which data structures the replication policy applies to. In other examples, the applicability rules may also factor in child replication information when evaluating whether a particular policy is applicable. The one or more replication policies may have one or more criteria that determine, based upon the child replication information and/or other information, whether a record is to be replicated and where. The replication rules may specify whether, given the child replication information of all child records, certain child records, or other information in either the parent records or child records whether all child records are replicated or whether only certain child records are replicated. As noted, the child replication information may be a geolocation or media usage data.

In some examples, the replication rules may be implemented as "if-then-else" statements which compare the values of the child replication information and/or other data stored within the parent record and/or child records to values. For example, "if <the child record has a location X in the child replication information> then <replicate only that child record to data storage region for location X>" As another example "if <the child record has a location X in the child replication information> then <replicate the child record and parent record to data storage region for location X>" As yet another example: "<the child record has a location X in the child replication information> then <replicate the parent and all child records to data storage region for location X>" This policy may be implemented using a processor, such as processor 1802 by configuring the processor using instructions (such as instructions 1824).

Index query component 1415 may query an index servicing a data storage region to determine if one or more records are present in the index and may also insert one or more records into one or more indices as a result of replication of one or more records to record the presence of the replicated record in the data storage of one or more data storage regions. Index query component 1415 may implement one or more Application Programming Interfaces (APIs) to query the index. For example, a Structured Query Language (SQL), Simple Object Access Protocol (SOAP), or the like.

Index query component 1415 may be implemented by a processor, such as processor 1802 by configuring the processor using instructions (such as instructions 1824). Index query component 1415 may communicate with the index using a network interface, such as network interface device 1820.

Record copier 1420 may create one or more copies of parent and/or child records in working memory (e.g., main memory 1504) and/or storage device (e.g., drive unit 1516) of the replicator for replication. Record modifier 1430 may update the location of the child records in a copy of the parent record to point to local copies within the data storage region where the copy is to be (or has been) replicated. The record modifier may be implemented by a processor, such as processor 1802 by configuring the processor using instructions (such as instructions 1824).

Storage component 1425 may cause storage of one or more copies of the record at one or more data storage regions. In some examples, this may be storage at a data storage region where the replicator is located. In other examples, this may be storage at a data storage region remote from where the replicator is located. This may be accomplished using one or more Application Programming Interfaces (APIs). For example, a Structured Query Language (SQL), Simple Object Access Protocol (SOAP), or the like. The record copier 1420 may be implemented by a processor, such as processor 1802 by configuring the processor using instructions (such as instructions 1824). The record copier 1420 may communicate with the index using a network interface, such as network interface device 1820.

As previously described the system may replicate records such that media stored within those records is stored at a geographic or logical network location closer to where demand is for the media. Media may include a recording of a network-based meeting; items or files shared amongst participants before, during, or after the meeting; a transcript of the meeting; chat sessions associated with the meeting; and the like. In some examples, a meeting object may store links to one or more child records that have media items from the meeting. In some examples, a meeting object may be stored in one storage region and have links to one or more other storage regions that have child records. That is, the parent record may not be replicated along with the child record. In some examples, the child records of a network-based meeting may be termed component records and may store media, information and metrics about connections between a user device and a media server during the meeting, and the like.

Figure 15:
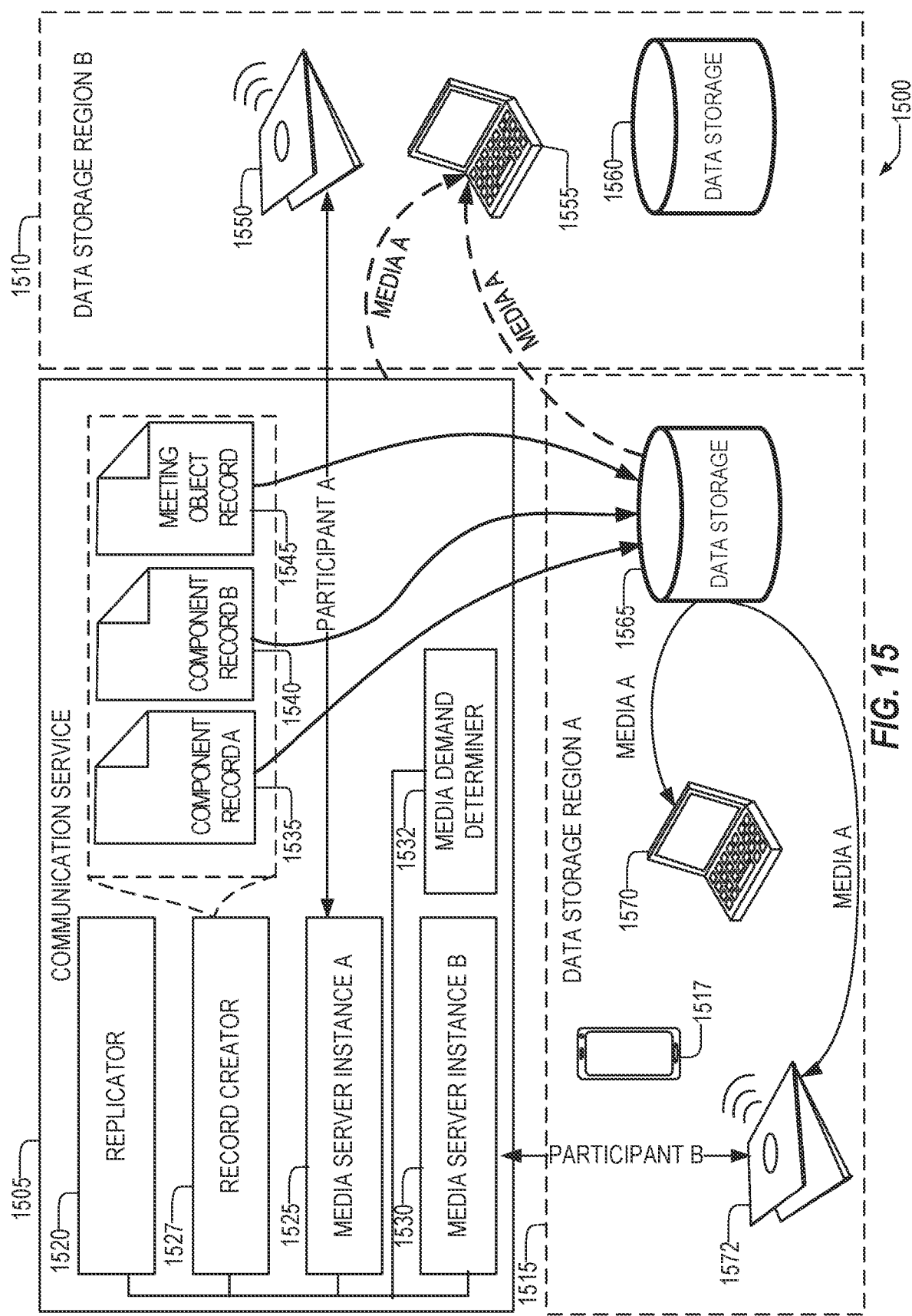
FIG. 15 illustrates a media delivery system of a network-based meeting using replication according to some examples of the present disclosure.

FIG. 15 illustrates a media delivery system 1500 of a network-based meeting using replication according to some examples of the present disclosure. Communication service 1505 may provide one or more network based meetings. A network-based meeting is a collaboration between multiple users over a network that includes real-time communications and may include pre, and post meeting communications, planning, and media sharing. The real-time communications aspect allows for real-time (or near-real time) audio and/or video communications as well as file sharing and text messaging, real-time chat, screen sharing, whiteboard sharing, and the like.

Communication service 1505 may manage one or more aspects of a network-based meeting including real-time communication aspects, pre meeting, post meeting, and other aspects. Media server instances, such as media server instance A 1525 and media server instance B 1530 may be an endpoint for one or more devices, such as participant computing device 1550 and participant computing device 1572 for real-time communication aspects of the network-based meeting. The media server instances may communicate with each other to provide real-time communications between participant computing devices, such as participant computing device 1572 and 1550 as well as file sharing, screen sharing, and other features.

Record creator 1527 may create one or more records of the network-based meeting. For example, a meeting object record 1545 and one or more component records, such as component record A 1535, and component record B 1540. For example, a component record may be created corresponding to a connection with a media server instance that records information about the session such as call metrics, call quality, and the like. In addition, media may be stored within the component records. For example, a media file A may be stored within the component record A 1535.

Replicator 1520 may be an example of replicator 1400 according to some examples of the present disclosure. Replicator 1520 may replicate one or more of the records to data storage of one or more data storage regions, such as data storage 1560 of data storage region B 1510 or data storage 1565 of data storage region A 1515. Media demand determiner 1532 may determine a demand for media of the network-based meeting. The demand may be an actual demand—that is, a number of accesses or attempted accesses of a particular item of media. The demand may be a predicted demand. The predicted demand may be based upon a number of users authorized to access the media and their locations. The record creator 1527 may use the media demand to set the replication information in the various component records and/or the meeting object record.

Data storage region A 1515 and data storage region B 1510 may service one or more geographic or logical network regions that include participant computing devices 1572, 1550; and other user computing devices 1570, 1517, and 1555. Participant computing devices 1572, 1550 are participants in a real-time communications portion of a network-based meeting. User computing devices 1570, 1517, and 1555 may not be participants in the real-time communication portion, but may be otherwise authorized to access media and information about the network-based meeting.

As shown in FIG. 15, the records 1535, 1540, and 1545 are all replicated to data storage region A 1515. In some examples, this may be due to the predicted demand for the media in data storage region A. For example, there are three computing devices (1572, 1517, and 1570) that are authorized to access the media of the network-based meeting and only two devices in data storage region B 1510.

When accessing media A, computing devices 1570, 1517, and 1572 may access the media from data storage 1565 of data storage region A 1515. In some examples, the devices first request the media from the communication service 1505. In these examples, the communication service 1505 may determine from the meeting object record 1545 stored at the communication service 1505 that the media was replicated to a data storage region local to the computing devices 1570, 1572, 1517. The communication service 1505 may then instruct these devices to obtain the media from the data storage 1565.

For devices in other data storage regions, such as device 1555, the communication service 1505 may instruct them to obtain the media from either the communication service 1505 or from the data storage 1565 in the data storage region A 1515. For example, the system may be configured such that certain data storage regions may obtain media from other data storage regions or from the communication service. In other examples, the communication service 1505 may redirect a device within a particular data storage region that does not have the media replicated to it to a data storage device in a different data storage region if the communication server is busy (e.g., a service load exceeds a threshold). In still other examples, the system may randomly choose whether to obtain the media from the communication service or a different data storage region where the media was replicated. Over time, the system may learn through observation of file transfer speeds, a fastest way to access the media—whether it is through the communication service, or through a different data storage region and under which conditions. For example, at a first time, the communication service may be fastest, but in other circumstances a different data storage region may be fastest.

Figure 16:
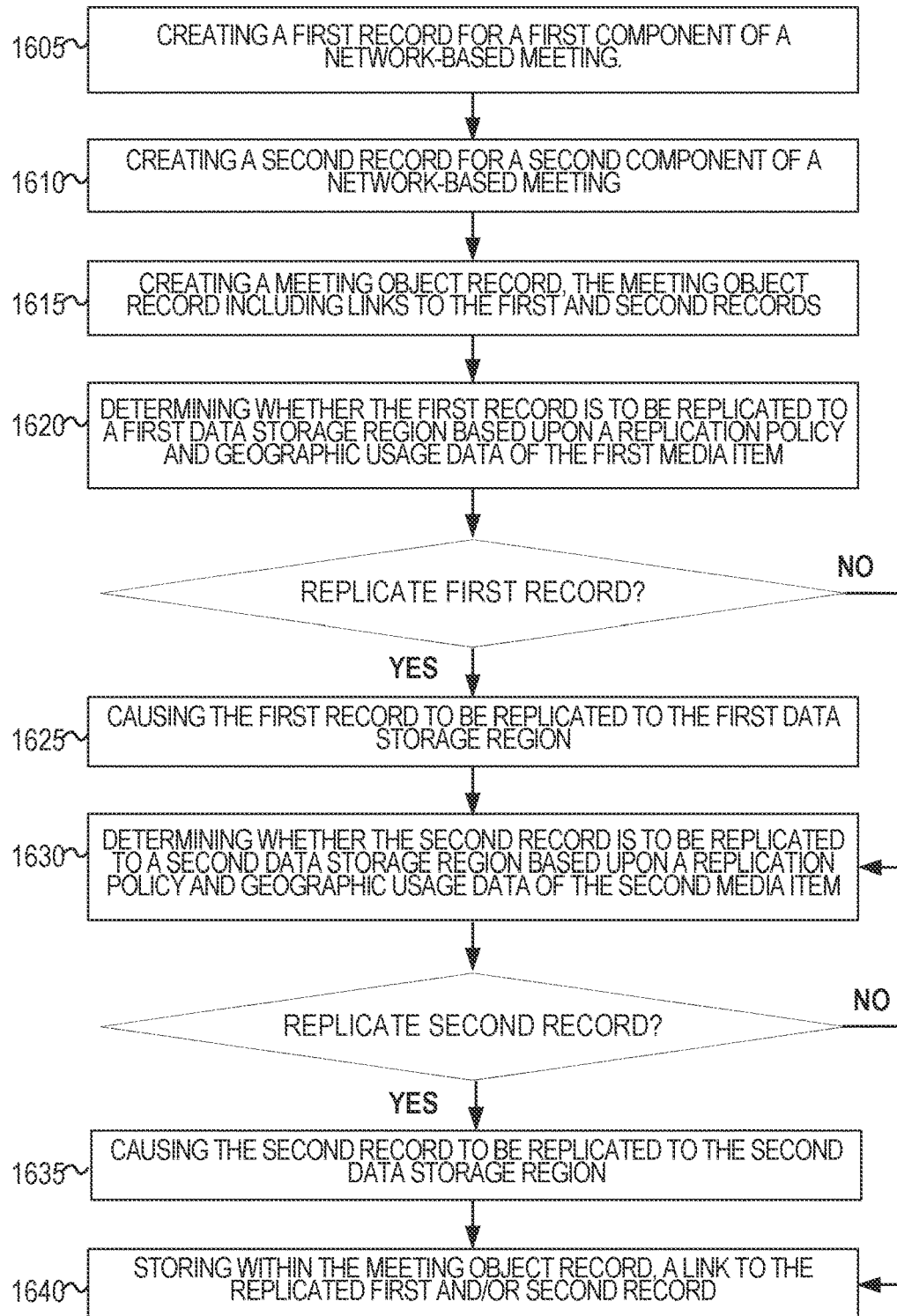
FIG. 16 illustrates a flowchart of a method of replicating network-based meeting records based upon a media demand according to some examples of the present disclosure.

FIG. 16 illustrates a flowchart of a method 1600 of replicating network-based meeting records based upon a media demand according to some examples of the present disclosure. At operation 1605, the system (e.g., a communication service) may create a first record for a first component of a network-based meeting. At operation 1610, the system (e.g., the communication service) may create a second record for a second component of the network-based meeting. The first and second records may be records describing connection information between one or more devices and a media server; may describe or include media; and/or the like.

At operation 1615 the system (e.g., the communication service) may create a meeting object record including links to the first and second records. At operation 1620, the system may determine whether the first record is to be replicated to a first data storage region based upon a replication policy and geographic usage data of a first media item that is stored within the first record. In some examples, rather than being a separate record, the record may be the media file.

In some examples, the replication policy may specify to which data storage regions to replicate the first record based upon the geographic usage data. For example, the replication policy may specify that the record be replicated to a top three geographic regions based upon actual usage. In other examples, the replication policy may specify that the record be replicated to the three data storage regions with the greatest number of participants of a real-time communication component of an online meeting. In still other examples, the replication policy may specify that the record be replicated to the three data storage regions with the greatest number of users authorized to access the media item.

If the first record is not to be replicated the flow proceeds to operation 1630. If the first record is to be replicated, then the first record is caused to be replicated to data storage on the first data storage region at operation 1625. For example, by sending the first record to a replicator on the first data storage region or by sending a notification to a replicator on the first data storage region.

At operation 1630, the system may determine whether the second record is to be replicated to a second data storage region based upon a replication policy and geographic usage data of the second media item. In some examples, the replication policy may specify to which data storage regions to replicate the first record based upon the geographic usage data. For example, the replication policy specify that the record be replicated to a top three geographic regions based upon actual usage. In other examples, the replication policy may specify that the record be replicated to the three data storage regions with the greatest number of participants of a real-time communication component of an online meeting. In still other examples, the replication policy may specify that the record be replicated to the three data storage regions with the greatest number of users authorized to access the media item. The first and second data storage regions may be different. That is, some media of the network-based meeting may be replicated to different regions.

If the second record is not to be replicated, then flow proceeds to operation 1640. If the second record is to be replicated, then at operation 1635, the second record may be replicated to the second region (e.g., in a same or similar fashion as the first record to the first data storage region).

In some examples, the meeting object record is also replicated to the first and/or second data storage regions. Whether the meeting object record is replicated may be determined by the replication policy or by design choice. The original meeting object record and/or the replicated meeting object records may store information on what records associated with a particular meeting are replicated where.

At operation 1640, the meeting object record stored at the network-based communication service may be updated to store links to the replicated copies of the first and/or second record (depending on which records were replicated). This record may be used by the network-based communication service, or another device that may route requests for media of the network-based meeting, to determine a source for requested media as described in FIG. 17. As shown, the network-based communication service routes requests for media and stores the original records of the network-based meeting, but in other examples, other components may also perform these tasks.

While the disclosed examples utilized media usage information, one of ordinary skill in the art with the benefit of the present disclosure will appreciate that other usage information for other records, such as call statistics, may also be utilized and the present methods and systems are not limited to media and media demand, but may be applied to any type of data. Additionally, the parent, or group record, in the example of FIG. 16 may or may not be replicated to one or more of the locations of the child records. Furthermore, the parent record may have links to the locations of all the child records.

Figure 17:
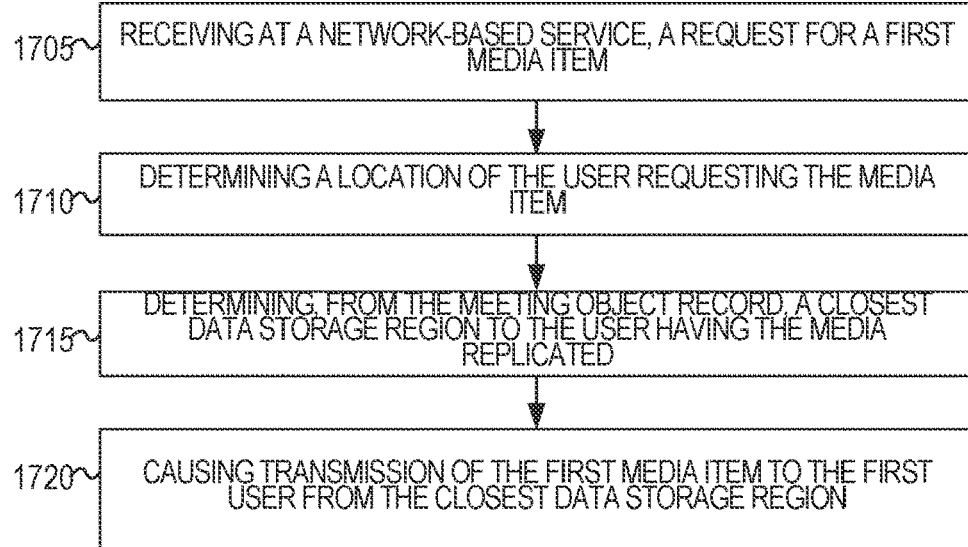
FIG. 17 illustrates a flowchart of a method for processing a request for a media item or other record of a network-based meeting.

FIG. 17 illustrates a flowchart of a method 1700 for processing a request for a media item or other record of a network-based meeting. At operation 1705, the system may receive a request (e.g., at a network-based service) a request for a first media item. In some examples, the network-based service may authenticate the request. At operation 1710, the system may determine a location of the user device requesting the media. For example, by mapping an Internet Protocol address of the user device to a location. At operation 1715, the system may determine, from the meeting object record, a closes data storage region to the user having the media replicated. At operation 1720, the system may cause the media to be delivered to the user from the data storage region identified in operation 1715. In some examples, the network-based meeting service may send a link to the user device and the user device may then use the link to download the media; in other examples, the network-based meeting service may instruct the data storage region selected at operation 1715 to send the media to the user device.

In some examples, where the media may be replicated to multiple data storage regions, each user may be directed to a different region to get the media based upon their user credentials or based upon system load. That is, some users in a same location may be directed to different data storage regions depending on either or a combination of system load and/or system configurations.

Figure 18:
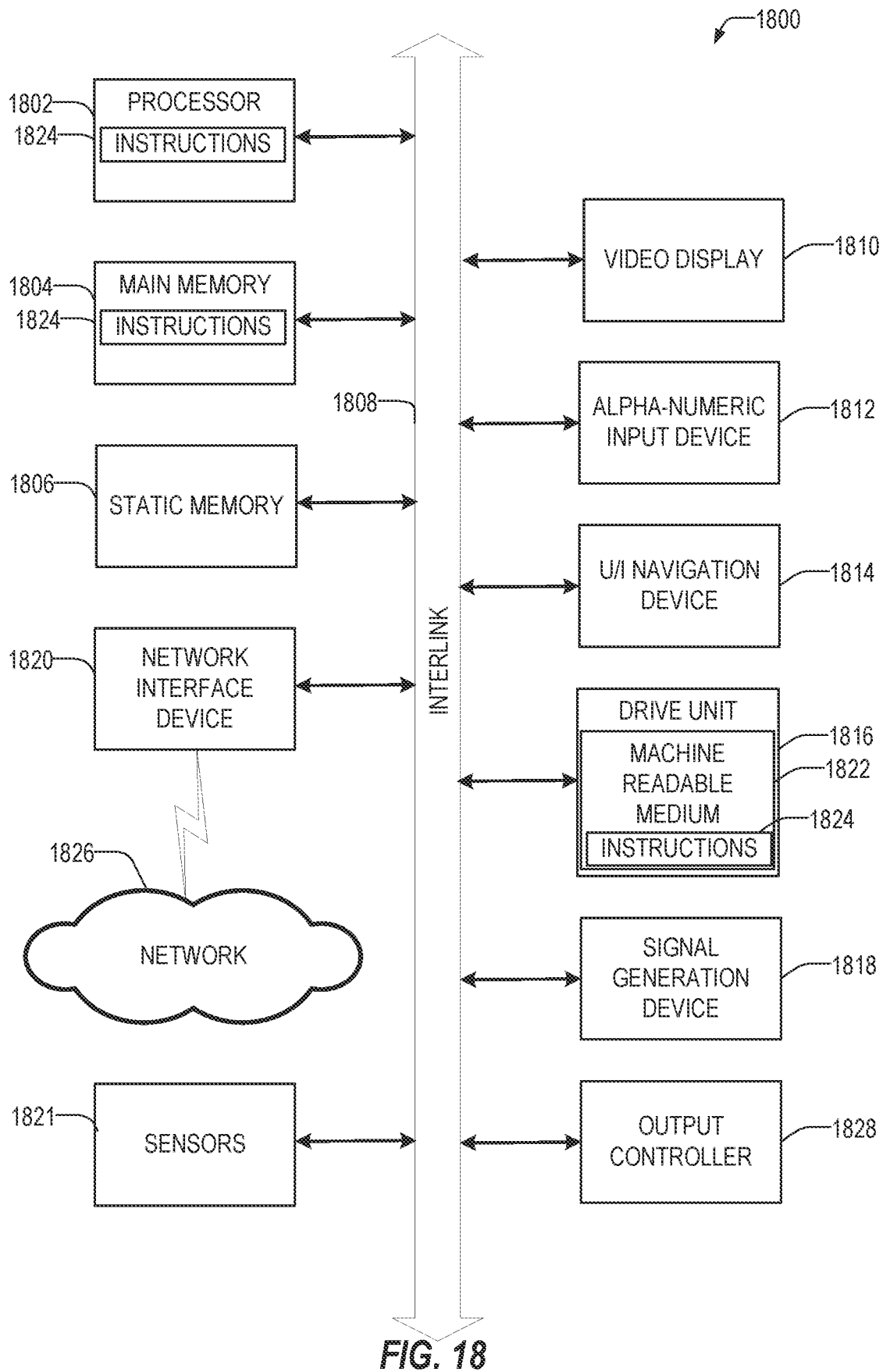
FIG. 18 is a block diagram illustrating an example of a machine upon which one or more embodiments may be implemented.

FIG. 18 illustrates a block diagram of an example machine 1800 upon which any one or more of the techniques (e.g., methodologies) discussed herein may perform. In alternative embodiments, the machine 1800 may operate as a standalone device or may be connected (e.g., networked) to other machines. In a networked deployment, the machine 1800 may operate in the capacity of a server machine, a client machine, or both in server-client network environments. In an example, the machine 1800 may act as a peer machine in peer-to-peer (P2P) (or other distributed) network environment. Machine 1800 may be configured to create and/or store parent records (e.g., such as parent records 105, 310, 610, 612), child records (120, 315, 630, 632, 634, 652, 654, 656), and the like. Machine 1800 may implement the replicator, index, data storage, and the like. For example, replicator 220, index 240, data storage for data storage region A 215, data storage for data storage region B 230, queue 330, and the like. Machine 1800 may implement the data flows, methods, systems, devices, and any of the components shown in FIGS. 1-17.

The machine 1800 may be in the form of a personal computer (PC), a tablet PC, a set-top box (STB), a personal digital assistant (PDA), a mobile telephone, a smart phone, a web appliance, a network router, a server, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1800 may include a hardware processor 1802 (e.g., a central processing unit (CPU), a graphics processing unit (GPU), a hardware processor core, or any combination thereof), a main memory 1804 and a static memory 1806, some or all of which may communicate with each other via an interlink (e.g., bus) 1808. The machine 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The machine 1800 may additionally include a storage device (e.g., drive unit) 1816, a signal generation device 1818 (e.g., a speaker), a network interface device 1820, and one or more sensors 1821, such as a global positioning system (GPS) sensor, compass, accelerometer, or other sensor. The machine 1800 may include an output controller 1828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1816 may include a machine readable medium 1822 on which is stored one or more sets of data structures or instructions 1824 (e.g., software) embodying or utilized by any one or more of the techniques or functions described herein. The instructions 1824 may also reside, completely or at least partially, within the main memory 1804, within static memory 1806, or within the hardware processor 1802 during execution thereof by the machine 1800. In an example, one or any combination of the hardware processor 1802, the main memory 1804, the static memory 1806, or the storage device 1816 may constitute machine readable media.

While the machine readable medium 1822 is illustrated as a single medium, the term "machine readable medium" may include a single medium or multiple media (e.g., a centralized or distributed database, and/or associated caches and servers) configured to store the one or more instructions 1824.

The term "machine readable medium" may include any medium that is capable of storing, encoding, or carrying instructions for execution by the machine 1800 and that cause the machine 1800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1824 may further be transmitted or received over a communications network 1826 using a transmission medium via the network interface device 1820. The Machine 1800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), multiple-input multiple-output (MIMO), or multiple-input single-output (MISO) techniques. In some examples, the network interface device 1820 may wirelessly communicate using Multiple User MIMO techniques.

OTHER NOTES AND EXAMPLES

Example 1 is a device for asynchronous data replication of hierarchically related records across data storage regions, the device comprising: a processor; a memory, storing instructions, which when executed by the processor, causes the device to perform operations comprising: receiving an indication that a first record is available for replication; determining whether the first record includes, a description of a second record, the description of the second record including replication information for the second record and a record identifier identifying the second record, the second record a child record of the first record; responsive to determining that the first record includes the description of the second record: determining, based upon the replication information in the description of the second record and a replication policy, whether the first record is to be replicated to a data storage region; and responsive to determining that the first record is to be replicated to the data storage region, causing replication of the first record to the data storage region, the replication comprising: determining whether an index of the data storage region contains an entry with a field matching the record identifier of the second record; responsive to determining that the index contains the entry with the field matching the record identifier of the second record, determining that the second record has already been replicated to the data storage region; responsive to determining that the second record has already been replicated to the data storage region, updating the description of the second record in a copy of the first record to point to a location of the second record in the data storage region, the location stored in the index; and causing the copy of the first record to be stored in data storage of the data storage region.

In Example 2, the subject matter of Example 1 includes, wherein the second record is a session record describing communications between a communication application and a media controller of a communication service, and wherein the record identifier is a session identifier identifying the communication session, and wherein the first record is a group record describing a network-based meeting.

In Example 3, the subject matter of Example 2 includes, wherein the second record includes media shared during the network-based meeting.

In Example 4, the subject matter of Examples 1-3 includes, wherein the operations further comprise: receiving an indication that the second record is available for replication, the second record including replication information and a record identifier; determining, from the replication information and the replication policy, whether to replicate the second record to the data storage region; and responsive to determining that the second record is to be replicated to the data storage region, causing the second record to be stored in a data storage of the data storage region and the index to be updated with the record identifier and the location.

In Example 5, the subject matter of Example 4 includes, wherein the operations further comprise: determining whether the first record includes a description of a third record, the description including replication information and a record identifier identifying the third record; responsive to determining that the first record includes the description of the third record, as part of the replication: determining whether the index of the data storage region contains a second entry with a field matching a second record identifier of the third record; responsive to determining that the index contains the second entry with the field matching the second record identifier of the third record, determining that the third record has already been replicated to the data storage region; responsive to determining that the third record has already been replicated to the second data storage region, updating the description of the third record in the copy of the second record to point to a second location of the third record in the second data storage region, the second location stored in the index; and wherein the replication of the second and third records is performed independently.

In Example 6, the subject matter of Examples 1-5 includes, wherein the operations further comprise: responsive to determining that the index does not contain the entry with the field matching the record identifier of the second record, waiting a prespecified amount of time; and wherein the determining whether the index of the data storage region contains an entry with the field matching the record identifier of the second record, the determining that the second record has already been replicated to the data storage region, the updating the description of the second record in a copy of the first record to point to a location of the second record in the data storage region, the location stored in the index and causing the copy of the first record to be stored in data storage of the data storage region are performed after the prespecified amount of time has passed.

In Example 7, the subject matter of Examples 1-6 includes, wherein the replication information of the second record comprises a geographic region in which a user associated with the second record is located.

Example 8 is a method of asynchronous data replication of hierarchically related records across data storage regions, the method comprising: receiving an indication that a first record is available for replication; determining whether the first record includes, a description of a second record, the description of the second record including replication information for the second record and a record identifier identifying the second record, the second record a child record of the first record; responsive to determining that the first record includes the description of the second record; determining, based upon the replication information in the description of the second record and a replication policy, whether the first record is to be replicated to a data storage region; and responsive to determining that the first record is to be replicated to the data storage region, causing replication of the first record to the data storage region, the replication comprising: determining whether an index of the data storage region contains an entry with a field matching the record identifier of the second record; responsive to determining that the index contains the entry with the field matching the record identifier of the second record, determining that the second record has already been replicated to the data storage region; responsive to determining that the second record has already been replicated to the data storage region, updating the description of the second record in a copy of the first record to point to a location of the second record in the data storage region, the location stored in the index; and causing the copy of the first record to be stored in data storage of the data storage region.

In Example 9, the subject matter of Example 8 includes, wherein the second record is a session record describing communications between a communication application and a media controller of a communication service, and wherein the record identifier is a session identifier identifying the communication session, and wherein the first record is a group record describing a network-based meeting.

In Example 10, the subject matter of Example 9 includes, wherein the second record includes media shared during the network-based meeting.

In Example 11, the subject matter of Examples 8-10 includes, receiving an indication that the second record is available for replication, the second record including replication information and a record identifier; determining, from the replication information and the replication policy, whether to replicate the second record to the data storage region; and responsive to determining that the second record is to be replicated to the data storage region, causing the second record to be stored in a data storage of the data storage region and the index to be updated with the record identifier and the location.

In Example 12, the subject matter of Example 11 includes, determining whether the first record includes a description of a third record, the description including replication information and a record identifier identifying the third record; responsive to determining that the first record includes the description of the third record, as part of the replication; determining whether the index of the data storage region contains a second entry with a field matching a second record identifier of the third record; responsive to determining that the index contains the second entry with the field matching the second record identifier of the third record, determining that the third record has already been replicated to the data storage region; responsive to determining that the third record has already been replicated to the second data storage region, updating the description of the third record in the copy of the second record to point to a second location of the third record in the second data storage region, the second location stored in the index; and wherein the replication of the second and third records is performed independently.

In Example 13, the subject matter of Examples 8-12 includes, responsive to determining that the index does not contain the entry with the field matching the record identifier of the second record, waiting a prespecified amount of time; and wherein the determining whether the index of the data storage region contains an entry with the field matching the record identifier of the second record, the determining that the second record has already been replicated to the data storage region, the updating the description of the second record in a copy of the first record to point to a location of the second record in the data storage region, the location stored in the index and causing the copy of the first record to be stored in data storage of the data storage region are performed after the prespecified amount of time has passed.

In Example 14, the subject matter of Examples 8-13 includes, wherein the replication information of the second record comprises a geographic region in which a user associated with the second record is located.

Example 15 is a machine-readable medium storing instructions for asynchronous data replication of hierarchically related records across data storage regions, the instructions, which when executed by a machine, causes the machine to perform operations comprising: receiving an indication that a first record is available for replication; determining whether the first record includes, a description of a second record, the description of the second record including replication information for the second record and a record identifier identifying the second record, the second record a child record of the first record; responsive to determining that the first record includes the description of the second record: determining, based upon the replication information in the description of the second record and a replication policy, whether the first record is to be replicated to a data storage region; and responsive to determining that the first record is to be replicated to the data storage region, causing replication of the first record to the data storage region, the replication comprising: determining whether an index of the data storage region contains an entry with a field matching the record identifier of the second record; responsive to determining that the index contains the entry with the field matching the record identifier of the second record, determining that the second record has already been replicated to the data storage region; responsive to determining that the second record has already been replicated to the data storage region, updating the description of the second record in a copy of the first record to point to a location of the second record in the data storage region, the location stored in the index; and causing the copy of the first record to be stored in data storage of the data storage region.

In Example 16, the subject matter of Example 15 includes, wherein the second record is a session record describing communications between a communication application and a media controller of a communication service, and wherein the record identifier is a session identifier identifying the communication session, and wherein the first record is a group record describing a network-based meeting.

In Example 17, the subject matter of Example 16 includes, wherein the second record includes media shared during the network-based meeting.

In Example 18, the subject matter of Examples 15-17 includes, wherein the operations further comprise: receiving an indication that the second record is available for replication, the second record including replication information and a record identifier; determining, from the replication information and the replication policy, whether to replicate the second record to the data storage region; and responsive to determining that the second record is to be replicated to the data storage region, causing the second record to be stored in a data storage of the data storage region and the index to be updated with the record identifier and the location.

In Example 19, the subject matter of Example 18 includes, wherein the operations further comprise: determining whether the first record includes a description of a third record, the description including replication information and a record identifier identifying the third record; responsive to determining that the first record includes the description of the third record, as part of the replication: determining whether the index of the data storage region contains a second entry with a field matching a second record identifier of the third record; responsive to determining that the index contains the second entry with the field matching the second record identifier of the third record, determining that the third record has already been replicated to the data storage region; responsive to determining that the third record has already been replicated to the second data storage region, updating the description of the third record in the copy of the second record to point to a second location of the third record in the second data storage region, the second location stored in the index; and wherein the replication of the second and third records is performed independently.

In Example 20, the subject matter of Examples 15-19 includes, wherein the operations further comprise: responsive to determining that the index does not contain the entry with the field matching the record identifier of the second record, waiting a prespecified amount of time; and wherein the determining whether the index of the data storage region contains an entry with the field matching the record identifier of the second record, the determining that the second record has already been replicated to the data storage region, the updating the description of the second record in a copy of the first record to point to a location of the second record in the data storage region, the location stored in the index and causing the copy of the first record to be stored in data storage of the data storage region are performed after the prespecified amount of time has passed.

In Example 21, the subject matter of Examples 15-20 includes, wherein the replication information of the second record comprises a geographic region in which a user associated with the second record is located.

Example 22 is a device asynchronous data replication of hierarchically related records across data storage regions, the device comprising: means for receiving an indication that a first record is available for replication; means for determining whether the first record includes, a description of a second record, the description of the second record including replication information for the second record and a record identifier identifying the second record, the second record a child record of the first record; responsive to determining that the first record includes the description of the second record; means for determining, based upon the replication information in the description of the second record and a replication policy, whether the first record is to be replicated to a data storage region; and means for, responsive to determining that the first record is to be replicated to the data storage region, causing replication of the first record to the data storage region, the replication comprising: determining whether an index of the second data storage region contains an entry with a field matching the record identifier of the second record; responsive to determining that the index contains the entry with the field matching the record identifier of the second record, determining that the second record has already been replicated to the second data storage region; responsive to determining that the second record has already been replicated to the second data storage region, updating the description of the second record in a copy of the first record to point to a location of the second record in the second data storage region, the location stored in the index; and causing the copy of the first record to be stored in data storage of the second data storage region.

In Example 23, the subject matter of Example 22 includes, wherein the second record is a session record describing communications between a communication application and a media controller of a communication service, and wherein the record identifier is a session identifier identifying the communication session, and wherein the first record is a group record describing a network-based meeting.

In Example 24, the subject matter of Example 23 includes, wherein the second record includes media shared during the network-based meeting.

In Example 25, the subject matter of Examples 22-24 includes, means for receiving an indication that the second record is available for replication, the second record including replication information and a record identifier; means for determining, from the replication information and the replication policy, whether to replicate the second record to the data storage region; and means for, responsive to determining that the second record is to be replicated to the data storage region, causing the second record to be stored in a data storage of the data storage region and the index to be updated with the record identifier and the location.

In Example 26, the subject matter of Example 25 includes, means for determining whether the first record includes a description of a third record, the description including replication information and a record identifier identifying the third record; means for, responsive to determining that the first record includes the description of the third record, as part of the replication; determining whether the index of the data storage region contains a second entry with a field matching a second record identifier of the third record; responsive to determining that the index contains the second entry with the field matching the second record identifier of the third record, determining that the third record has already been replicated to the data storage region; responsive to determining that the third record has already been replicated to the second data storage region, updating the description of the third record in the copy of the second record to point to a second location of the third record in the second data storage region, the second location stored in the index; and wherein the replication of the second and third records is performed independently.

In Example 27, the subject matter of Examples 22-26 includes, means for, responsive to determining that the index does not contain the entry with the field matching the record identifier of the second record, waiting a prespecified amount of time; and wherein the determining whether the index of the data storage region contains an entry with the field matching the record identifier of the second record, the determining that the second record has already been replicated to the data storage region, the updating the description of the second record in a copy of the first record to point to a location of the second record in the data storage region, the location stored in the index and causing the copy of the first record to be stored in data storage of the data storage region are performed after the prespecified amount of time has passed.

In Example 28, the subject matter of Examples 22-27 includes, wherein the replication information of the second record comprises a geographic region in which a user associated with the second record is located.

Example 29 is a device for asynchronous data replication of hierarchically related records across data storage regions, the device comprising: a processor; a memory, storing instructions, which when executed by the processor, causes the device to perform operations comprising: receiving, an indication that a first record is available for replication, the first record including replication information associated with the first record; determining whether the first record includes, a description of a second record, the second record a parent record of the first record; determining, based upon the replication information in the first record and a replication policy, whether the first record is to be replicated to a data storage region; responsive to determining that the first record is to be replicated to the data storage region, causing replication of the first record to the data storage region; determining whether an index of the data storage region contains an entry with a field matching a record identifier of the second record; responsive to determining that the index contains the entry with the field matching the record identifier of the second record, determining that the second record has already been replicated to the data storage region; and responsive to determining that the second record has already been replicated to the data storage region, updating, in a description of the second record, a pointer to a location of the first record in the data storage region.

In Example 30, the subject matter of Example 29 includes, wherein the first record is a session record describing communications between a communication application and a media controller of a communication service, and wherein the record identifier is a group identifier identifying a network-based meeting, and wherein the second record is a group record describing the network-based meeting.

In Example 31, the subject matter of Example 30 includes, wherein the first record includes media shared during the network-based meeting.

In Example 32, the subject matter of Examples 29-31 includes, wherein the replication information is a geographic location of a user.

In Example 33, the subject matter of Examples 29-32 includes, wherein the operations further comprise: receiving a second indication that a third record is available, the third record including replication information associated with the third record; determining whether the third record includes a description of a fourth record, the fourth record a parent record of the third record; determining, based upon the replication information in the third record and a replication policy, whether the third record is to be replicated to the data storage region; responsive to determining that the third record is to be replicated to the data storage region, causing replication of the third record to the data storage region; determining whether an index of the second data storage region contains an entry with a field matching the record identifier of the fourth record; and responsive to determining that the index does not contain the entry with the field matching the record identifier of the fourth record, determining that the fourth record has not already been replicated to the data storage region.

In Example 34, the subject matter of Examples 29-33 includes, wherein the indication that the first record is available comprises an indication that the first record was created, modified, is complete, or is ready for replication.

In Example 35, the subject matter of Examples 29-34 includes, wherein the description of the second record comprises an identifier of the second record.

In Example 36, the subject matter of Examples 29-35 includes, determining that a third record is not to be replicated to the data storage region based upon a replication policy.

In Example 37, the subject matter of Example 36 includes, wherein the replication policy comprises a replication policy based upon a privacy law.

Example 38 is a method of asynchronous data replication of hierarchically related records across data storage regions, the method comprising: receiving, an indication that a first record is available for replication, the first record including replication information associated with the first record; determining whether the first record includes, a description of a second record, the second record a parent record of the first record; determining, based upon the replication information in the first record and a replication policy, whether the first record is to be replicated to a data storage region; responsive to determining that the first record is to be replicated to the data storage region, causing replication of the first record to the data storage region; determining whether an index of the data storage region contains an entry with a field matching a record identifier of the second record; responsive to determining that the index contains the entry with the field matching the record identifier of the second record, determining that the second record has already been replicated to the data storage region; and responsive to determining that the second record has already been replicated to the data storage region, updating, in a description of the second record, a pointer to a location of the first record in the data storage region.

In Example 39, the subject matter of Example 38 includes, wherein the first record is a session record describing communications between a communication application and a media controller of a communication service, and wherein the record identifier is a group identifier identifying a network-based meeting, and wherein the second record is a group record describing the network-based meeting.

In Example 40, the subject matter of Example 39 includes, wherein the first record includes media shared during the network-based meeting.

In Example 41, the subject matter of Examples 38-40 includes, wherein the replication information is a geographic location of a user.

In Example 42, the subject matter of Examples 38-41 includes, receiving a second indication that a third record is available, the third record including replication information associated with the third record; determining whether the third record includes a description of a fourth record, the fourth record a parent record of the third record; determining, based upon the replication information in the third record and a replication policy, whether the third record is to be replicated to the data storage region; responsive to determining that the third record is to be replicated to the data storage region, causing replication of the third record to the data storage region; determining whether an index of the second data storage region contains an entry with a field matching the record identifier of the fourth record; and responsive to determining that the index does not contain the entry with the field matching the record identifier of the fourth record, determining that the fourth record has not already been replicated to the data storage region.

In Example 43, the subject matter of Examples 38-42 includes, wherein the indication that the first record is available comprises an indication that the first record was created, modified, is complete, or is ready for replication.

In Example 44, the subject matter of Examples 38-43 includes, wherein the description of the second record comprises an identifier of the second record.

In Example 45, the subject matter of Examples 38-44 includes, determining that a third record is not to be replicated to the data storage region based upon a replication policy.

In Example 46, the subject matter of Example 45 includes, wherein the replication policy comprises a replication policy based upon a privacy law.

Example 47 is a machine-readable medium storing instructions for asynchronous data replication of hierarchically related records across data storage regions, the instructions, which when executed by a machine, causes the machine to perform operations comprising: receiving, an indication that a first record is available for replication, the first record including replication information associated with the first record; determining whether the first record includes, a description of a second record, the second record a parent record of the first record; determining, based upon the replication information in the first record and a replication policy, whether the first record is to be replicated to a data storage region; responsive to determining that the first record is to be replicated to the data storage region, causing replication of the first record to the data storage region; determining whether an index of the data storage region contains an entry with a field matching a record identifier of the second record; responsive to determining that the index contains the entry with the field matching the record identifier of the second record, determining that the second record has already been replicated to the data storage region; and responsive to determining that the second record has already been replicated to the data storage region, updating, in a description of the second record, a pointer to a location of the first record in the data storage region.

In Example 48, the subject matter of Example 47 includes, wherein the first record is a session record describing communications between a communication application and a media controller of a communication service, and wherein the record identifier is a group identifier identifying a network-based meeting, and wherein the second record is a group record describing the network-based meeting.

In Example 49, the subject matter of Example 48 includes, wherein the first record includes media shared during the network-based meeting.

In Example 50, the subject matter of Examples 47-49 includes, wherein the replication information is a geographic location of a user.

In Example 51, the subject matter of Examples 47-50 includes, wherein the operations further comprise: receiving a second indication that a third record is available, the third record including replication information associated with the third record; determining whether the third record includes a description of a fourth record, the fourth record a parent record of the third record; determining, based upon the replication information in the third record and a replication policy, whether the third record is to be replicated to the data storage region; responsive to determining that the third record is to be replicated to the data storage region, causing replication of the third record to the data storage region; determining whether an index of the second data storage region contains an entry with a field matching the record identifier of the fourth record; and responsive to determining that the index does not contain the entry with the field matching the record identifier of the fourth record, determining that the fourth record has not already been replicated to the data storage region.

In Example 52, the subject matter of Examples 47-51 includes, wherein the indication that the first record is available comprises an indication that the first record was created, modified, is complete, or is ready for replication.

In Example 53, the subject matter of Examples 47-52 includes, wherein the description of the second record comprises an identifier of the second record.

In Example 54, the subject matter of Examples 47-53 includes, determining that a third record is not to be replicated to the data storage region based upon a replication policy.

In Example 55, the subject matter of Example 54 includes, wherein the replication policy comprises a replication policy based upon a privacy law.

Example 56 is a device for asynchronous data replication of hierarchically related records across data storage regions, the device comprising: means for receiving an indication that a first record is available for replication, the first record including replication information associated with the first record; means for determining whether the first record includes, a description of a second record, the second record a parent record of the first record; means for determining, based upon the replication information in the first record and a replication policy, whether the first record is to be replicated to a data storage region; means for, responsive to determining that the first record is to be replicated to the data storage region, causing replication of the first record to the data storage region; means for determining whether an index of the data storage region contains an entry with a field matching a record identifier of the second record; means for, responsive to determining that the index contains the entry with the field matching the record identifier of the second record, determining that the second record has already been replicated to the data storage region; and means for responsive to determining that the second record has already been replicated to the data storage region, updating, in a description of the second record, a pointer to a location of the first record in the data storage region.

In Example 57, the subject matter of Example 56 includes, wherein the first record is a session record describing communications between a communication application and a media controller of a communication service, and wherein the record identifier is a group identifier identifying a network-based meeting, and wherein the second record is a group record describing the network-based meeting.

In Example 58, the subject matter of Example 57 includes, wherein the first record includes media shared during the network-based meeting.

In Example 59, the subject matter of Examples 56-58 includes, wherein the replication information is a geographic location of a user.

In Example 60, the subject matter of Examples 56-59 includes, wherein the device further comprises: means for receiving a second indication that a third record is available, the third record including replication information associated with the third record; means for determining whether the third record includes a description of a fourth record, the fourth record a parent record of the third record; means for determining, based upon the replication information in the third record and a replication policy, whether the third record is to be replicated to the data storage region; means for, responsive to determining that the third record is to be replicated to the data storage region, causing replication of the third record to the data storage region; means for determining whether an index of the second data storage region contains an entry with a field matching the record identifier of the fourth record; and means for, responsive to determining that the index does not contain the entry with the field matching the record identifier of the fourth record, determining that the fourth record has not already been replicated to the data storage region.

In Example 61, the subject matter of Examples 56-60 includes, wherein the indication that the first record is available comprises an indication that the first record was created, modified, is complete, or is ready for replication.

In Example 62, the subject matter of Examples 56-61 includes, wherein the description of the second record comprises an identifier of the second record.

In Example 63, the subject matter of Examples 56-62 includes, means for determining that a third record is not to be replicated to the data storage region based upon a replication policy.

In Example 64, the subject matter of Example 63 includes, wherein the replication policy comprises a replication policy based upon a privacy law.

Example 65 is a device for distributing content of a network-based meeting, the device comprising: a processor; a memory, the memory storing instructions, which when executed by the processor, cause the device to perform operations comprising: creating a first record describing a first component of a network-based meeting and including a first media item of the network-based meeting; creating a second record describing a second component of the network-based meeting and including a second media item of the network-based meeting; creating a meeting object record, the meeting object record including links to the first record and the second record and information about the first media item and the second media item; determining whether the first record is to be replicated to a data storage region based upon a replication policy and geographical usage data of the first media item, the geographical usage data stored in replication information of the first record, the geographical usage data describing an actual or predicted demand of the first media item for a particular data storage region; responsive to determining that the first record is to be replicated to the data storage region, causing the first record to be replicated to the data storage region; determining that the second record is to be replicated to a second data storage region based upon the replication policy and geographical usage data of the second media item stored in replication information of the second record; responsive to determining that the second record is to be replicated to the second data storage region, causing the second record to be replicated to the second data storage region; and storing, within the meeting object record, a link to the replicated first record and the second record.

In Example 66, the subject matter of Example 65 includes, wherein the operations further comprise: receiving at a network-based meeting service, a request from a first user for the first media item; determining that the first user is within an area serviced by the data storage region; determining from the meeting object record, a closest data storage region to a user that has the media replicated, the closest data storage region being the data storage region; and causing transmission of the first media item to the first user from the data storage region.

In Example 67, the subject matter of Examples 65-66 includes, wherein the geographical usage data is a geographical location of participant computing devices of the network-based meeting.

In Example 68, the subject matter of Examples 65-67 includes, wherein the geographical usage data is a geographical demand for the first and second media item.

In Example 69, the subject matter of Examples 65-68 includes, wherein the media comprises audio of a conversation between a first and second participant of the network-based meeting.

In Example 70, the subject matter of Examples 65-69 includes, wherein the media comprises a file shared during the network-based meeting.

In Example 71, the subject matter of Examples 65-70 includes, wherein the first record is stored on an edge server in the data storage region.

In Example 72, the subject matter of Examples 65-71 includes, wherein the operations further comprise determining that the second record is not to be replicated to the data storage region based upon a replication policy.

In Example 73, the subject matter of Example 72 includes, wherein the replication policy comprises a replication policy based upon a privacy law.

Example 74 is a method for distributing content of a network-based meeting, the method comprising: creating a first record describing a first component of a network-based meeting and including a first media item of the network-based meeting; creating a second record describing a second component of the network-based meeting and including a second media item of the network-based meeting; creating a meeting object record, the meeting object record including links to the first record and the second record and information about the first media item and the second media item; determining whether the first record is to be replicated to a data storage region based upon a replication policy and geographical usage data of the first media item, the geographical usage data stored in replication information of the first record, the geographical usage data describing an actual or predicted demand of the first media item for a particular data storage region; responsive to determining that the first record is to be replicated to the data storage region, causing the first record to be replicated to the data storage region; determining that the second record is to be replicated to a second data storage region based upon the replication policy and geographical usage data of the second media item stored in replication information of the second record; responsive to determining that the second record is to be replicated to the second data storage region, causing the second record to be replicated to the second data storage region; and storing, within the meeting object record, a link to the replicated first record and the second record.

In Example 75, the subject matter of Example 74 includes, receiving at a network-based meeting service, a request from a first user for the first media item; determining that the first user is within an area serviced by the data storage region; determining from the meeting object record, a closest data storage region to a user that has the media replicated, the closest data storage region being the data storage region; and causing transmission of the first media item to the first user from the data storage region.

In Example 76, the subject matter of Examples 74-75 includes, wherein the geographical usage data is a geographical location of participant computing devices of the network-based meeting.

In Example 77, the subject matter of Examples 74-76 includes, wherein the geographical usage data is a geographical demand for the first and second media item.

In Example 78, the subject matter of Examples 74-77 includes, wherein the media comprises audio of a conversation between a first and second participant of the network-based meeting.

In Example 79, the subject matter of Examples 74-78 includes, wherein the media comprises a file shared during the network-based meeting.

In Example 80, the subject matter of Examples 74-79 includes, wherein the first record is stored on an edge server in the data storage region.

In Example 81, the subject matter of Examples 74-80 includes, determining that the second record is not to be replicated to the data storage region based upon a replication policy.

In Example 82, the subject matter of Example 81 includes, wherein the replication policy comprises a replication policy based upon a privacy law.

Example 83 is a machine-readable medium, storing instructions for distributing content of a network-based meeting, the instructions, when executed by a machine, cause the machine to perform operations comprising: creating a first record describing a first component of a network-based meeting and including a first media item of the network-based meeting; creating a second record describing a second component of the network-based meeting and including a second media item of the network-based meeting; creating a meeting object record, the meeting object record including links to the first record and the second record and information about the first media item and the second media item; determining whether the first record is to be replicated to a data storage region based upon a replication policy and geographical usage data of the first media item, the geographical usage data stored in replication information of the first record, the geographical usage data describing an actual or predicted demand of the first media item for a particular data storage region; responsive to determining that the first record is to be replicated to the data storage region, causing the first record to be replicated to the data storage region; determining that the second record is to be replicated to a second data storage region based upon the replication policy and geographical usage data of the second media item stored in replication information of the second record; responsive to determining that the second record is to be replicated to the second data storage region, causing the second record to be replicated to the second data storage region; and storing, within the meeting object record, a link to the replicated first record and the second record.

In Example 84, the subject matter of Example 83 includes, wherein the operations further comprise: receiving at a network-based meeting service, a request from a first user for the first media item; determining that the first user is within an area serviced by the data storage region; determining from the meeting object record, a closest data storage region to a user that has the media replicated, the closest data storage region being the data storage region; and causing transmission of the first media item to the first user from the data storage region.

In Example 85, the subject matter of Examples 83-84 includes, wherein the geographical usage data is a geographical location of participant computing devices of the network-based meeting.

In Example 86, the subject matter of Examples 83-85 includes, wherein the geographical usage data is a geographical demand for the first and second media item.

In Example 87, the subject matter of Examples 83-86 includes, wherein the media comprises audio of a conversation between a first and second participant of the network-based meeting.

In Example 88, the subject matter of Examples 83-87 includes, wherein the media comprises a file shared during the network-based meeting.

In Example 89, the subject matter of Examples 83-88 includes, wherein the first record is stored on an edge server in the data storage region.

In Example 90, the subject matter of Examples 83-89 includes, wherein the operations further comprise determining that the second record is not to be replicated to the data storage region based upon a replication policy.

In Example 91, the subject matter of Example 90 includes, wherein the replication policy comprises a replication policy based upon a privacy law.

Example 92 is a device for distributing content of a network-based meeting, the device comprising: means for creating a first record describing a first component of a network-based meeting and including a first media item of the network-based meeting; means for creating a second record describing a second component of the network-based meeting and including a second media item of the network-based meeting; means for creating a meeting object record, the meeting object record including links to the first record and the second record and information about the first media item and the second media item; means for determining whether the first record is to be replicated to a data storage region based upon a replication policy and geographical usage data of the first media item, the geographical usage data stored in replication information of the first record, the geographical usage data describing an actual or predicted demand of the first media item for a particular data storage region; means for responsive to determining that the first record is to be replicated to the data storage region, causing the first record to be replicated to the data storage region; means for determining that the second record is to be replicated to a second data storage region based upon the replication policy and geographical usage data of the second media item stored in replication information of the second record; means for, responsive to determining that the second record is to be replicated to the second data storage region, causing the second record to be replicated to the second data storage region; and means for storing, within the meeting object record, a link to the replicated first record and the second record.

In Example 93, the subject matter of Example 92 includes, means for receiving at a network-based meeting service, a request from a first user for the first media item; means for determining that the first user is within an area serviced by the data storage region; means for determining from the meeting object record, a closest data storage region to a user that has the media replicated, the closest data storage region being the data storage region; and means for causing transmission of the first media item to the first user from the data storage region.

In Example 94, the subject matter of Examples 92-93 includes, wherein the geographical usage data is a geographical location of participant computing devices of the network-based meeting.

In Example 95, the subject matter of Examples 92-94 includes, wherein the geographical usage data is a geographical demand for the first and second media item.

In Example 96, the subject matter of Examples 92-95 includes, wherein the media comprises audio of a conversation between a rust and second participant of the network-based meeting.

In Example 97, the subject matter of Examples 92-96 includes, wherein the media comprises a file shared during the network-based meeting.

In Example 98, the subject matter of Examples 92-97 includes, wherein the first record is stored on an edge server in the data storage region.

In Example 99, the subject matter of Examples 92-98 includes, determining that the second record is not to be replicated to the data storage region based upon a replication policy.

In Example 100, the subject matter of Example 99 includes, wherein the replication policy comprises a replication policy based upon a privacy law.

Example 101 is at least one machine-readable medium including instructions that, when executed by processing circuitry, cause the processing circuitry to perform operations to implement of any of Examples 1-100.

Example 102 is an apparatus comprising means to implement of any of Examples 1-100.

Example 103 is a system to implement of any of Examples 1-100.

Example 104 is a method to implement of any of Examples 1-100.

What is claimed is:

1. A device for distributing content of a network-based meeting, the device comprising:
   a processor;
   a memory, the memory storing instructions, which when executed by the processor, cause the device to perform operations comprising:
   creating a first record describing a first component of the network-based meeting and including a first media item of the network-based meeting;
   creating a second record describing a second component of the network-based meeting and including a second media item of the network-based meeting;
   creating a meeting object record, the meeting object record including links to the first record and the second record and information about the first media item and the second media item;
   selecting a first data storage region to replicate the first record to based upon a replication policy and geographical usage data of the first media item, the geographical usage data stored in replication information of the first record, the geographical usage data describing an actual or predicted demand of the first media item for a particular data storage region;
   responsive to selecting the first data storage region, causing the first record to be replicated to the first data storage region;
   selecting a second data storage region to replicate the second record to based upon the replication policy and geographical usage data of the second media item stored in replication information of the second record;
   responsive to selecting the second data storage region, causing the second record to be replicated to the second data storage region; and
   storing, within the meeting object record, a link to the replicated first record and the second record.

2. The device of claim 1, wherein the operations further comprise:
   receiving at a network-based meeting service, a request from a first user for the first media item;
   determining that the first user is within an area serviced by the first data storage region;
   determining from the meeting object record, a closest data storage region to a user that has the first media item replicated, the closest data storage region being the first data storage region; and
   causing transmission of the first media item to the first user from the first data storage region.

3. The device of claim 1, wherein the geographical usage data is a geographical location of participant computing devices of the network-based meeting.

4. The device of claim 1, wherein the geographical usage data is a geographical demand for the first and second media item.

5. The device of claim 1, wherein the first media item comprises audio of a conversation between a first and second participant of the network-based meeting.

6. The device of claim 1, wherein the first media item comprises a file shared during the network-based meeting.

7. The device of claim 1, wherein the first record is stored on an edge server in the first data storage region.

8. The device of claim 1, wherein the operations further comprise determining that the second record is not to be replicated to the first data storage region based upon the replication policy.

9. The device of claim 8, wherein the replication policy comprises a replication policy based upon a privacy law.

10. A method for distributing content of a network-based meeting, the method comprising:
    creating a first record describing a first component of the network-based meeting and including a first media item of the network-based meeting;
    creating a second record describing a second component of the network-based meeting and including a second media item of the network-based meeting;
    creating a meeting object record, the meeting object record including links to the first record and the second record and information about the first media item and the second media item;
    selecting a first data storage region to replicate the first record to based upon a replication policy and geographical usage data of the first media item, the geographical usage data stored in replication information of the first record, the geographical usage data describing an actual or predicted demand of the first media item for a particular data storage region;
    responsive to selecting the first data storage region, causing the first record to be replicated to the first data storage region;
    selecting a second data storage region to replicate the second record to based upon the replication policy and geographical usage data of the second media item stored in replication information of the second record;
    responsive to selecting the second data storage region, causing the second record to be replicated to the second data storage region; and
    storing, within the meeting object record, a link to the replicated first record and the second record.

11. The method of claim 10, further comprising:
    receiving at a network-based meeting service, a request from a first user for the first media item;
    determining that the first user is within an area serviced by the first data storage region;
    determining from the meeting object record, a closest data storage region to a user that has the first media item replicated, the closest data storage region being the first data storage region; and
    causing transmission of the first media item to the first user from the first data storage region.

12. The method of claim 10, wherein the geographical usage data is a geographical location of participant computing devices of the network-based meeting.

13. The method of claim 10; wherein the geographical usage data is a geographical demand for the first and second media item.

14. The method of claim 10, wherein the first media item comprises audio of a conversation between a first and second participant of the network-based meeting.

15. The method of claim 10, wherein the first media item comprises a file shared during the network-based meeting.

16. The method of claim 10, wherein the first record is stored on an edge server in the first data storage region.

17. The method of claim 10, further comprising determining that the second record is not to be replicated to the first data storage region based upon the replication policy.

18. The method of claim 17, wherein the replication policy comprises a replication policy based upon a privacy law.

19. A device for distributing content of a network-based meeting, the device comprising:
- means for creating a first record describing a first component of the network-based meeting and including a first media item of the network-based meeting;
- means for creating a second record describing a second component of the network-based meeting and including a second media item of the network-based meeting;
- means for creating a meeting object record, the meeting object record including links to the first record and the second record and information about the first media item and the second media item;
- means for selecting a first data storage region to replicate the first record to based upon a replication policy and geographical usage data of the first media item, the geographical usage data stored in replication information of the first record, the geographical usage data describing an actual or predicted demand of the first media item for a particular data storage region;
- means for responsive to selecting the first data storage region, causing the first record to be replicated to the first data storage region;
- means for selecting a second data storage region to replicate the second record to based upon the replication policy and geographical usage data of the second media item stored in replication information of the second record;
- means for, responsive to selecting the second data storage region, causing the second record to be replicated to the second data storage region; and
- means for storing, within the meeting object record, a link to the replicated first record and the second record.

20. The device of claim 19, further comprising:
- means for receiving at a network-based meeting service, a request from a first user for the first media item;
- means for determining that the first user is within an area serviced by the first data storage region;
- means for determining from the meeting object record, a closest data storage region to a user that has the first media item replicated, the closest data storage region being the first data storage region; and
- means for causing transmission of the first media item to the first user from the first data storage region.

* * * * *